(12) United States Patent
Yamamoto et al.

(10) Patent No.: US 6,361,435 B1
(45) Date of Patent: Mar. 26, 2002

(54) GENERAL PURPOSE COMBINED HARVESTER AND THRESHER

(75) Inventors: Akito Yamamoto; Kenji Hamada; Masami Nakamura; Toshinori Kirihata; Jun Terashima; Junichi Masano; Yuichi Shinpuku, all of Osaka (JP)

(73) Assignee: Yanmar Agricultural Equipment Co., Ltd., Osaka (JP)

( * ) Notice: Subject to any disclaimer, the term of this patent is extended or adjusted under 35 U.S.C. 154(b) by 0 days.

(21) Appl. No.: 09/486,209

(22) PCT Filed: Aug. 24, 1998

(86) PCT No.: PCT/JP98/03755

§ 371 Date: Jun. 19, 2000

§ 102(e) Date: Jun. 19, 2000

(87) PCT Pub. No.: WO99/09807

PCT Pub. Date: Mar. 4, 1999

(30) Foreign Application Priority Data

Aug. 26, 1997 (JP) .............................. 9-229184
Oct. 8, 1997 (JP) .............................. 9-276243

(51) Int. Cl.[7] .............................................. A01F 12/44
(52) U.S. Cl. ......................................... 460/99; 460/26
(58) Field of Search ................................ 56/14.6, 14.3, 56/14.4, 14.5; 460/69, 26, 73, 80, 75, 81, 84, 99, 100, 109, 110

(56) References Cited

U.S. PATENT DOCUMENTS

| | | | |
|---|---|---|---|
| 3,927,678 A | * 12/1975 | Rowland-Hill | 460/73 |
| 4,003,384 A | * 1/1977 | Komancheck et al. | 460/75 |
| 4,378,024 A | * 3/1983 | De Busscher et al. | 460/73 |
| RE31,860 E | * 4/1985 | Decoene et al. | 460/73 |
| 5,015,997 A | * 5/1991 | Strubbe | 340/684 |
| 5,342,239 A | * 8/1994 | West et al. | 460/69 |
| 5,624,315 A | * 4/1997 | Jonckheere | 460/99 |

FOREIGN PATENT DOCUMENTS

| | | | | |
|---|---|---|---|---|
| JP | 56-37551 | | 9/1981 | |
| JP | 58-193616 | | 11/1983 | |
| JP | 1-22438 | | 7/1989 | |
| JP | 3-39007 | | 8/1991 | |
| JP | 07298769 A | * | 5/1994 | ........... A01F/12/32 |
| JP | 7-298769 | | 11/1995 | |

OTHER PUBLICATIONS

Microfilm of the specification and drawings annexed to the request of Japanese Utility Model Application No. 144053/1983 (Laid–open No. 51940/1985) (Kazuyoshi Takayama), Apr. 12, 1985.

(List continued on next page.)

*Primary Examiner*—Robert E. Pezzuto
(74) *Attorney, Agent, or Firm*—Sterne Kessler Goldstein & Fox

(57) ABSTRACT

A general purpose combined harvester and thresher comprising a first rotor (51) and a second rotor (52) provided in a thresh unit (5) and arranged longitudinally in parallel to each other with axes thereof right and left, and a first receiving net (55) and a second receiving net (56) arranged below the respective rotors to define a first treating chamber (D1) and second treating chamber (D2). A grain tank (79) is arranged above the thresh unit (5), a base end of a discharge auger (83) is arranged outside the grain tank (79), an engine (84) is arranged behind the grain tank (79), and a transmission casing (85) is arranged below the engines A tooth bar (T1) is provided on an outer peripheral surface of the first rotor (51) facing a grain rod inlet (36), and a screw vane (53) has a pitch (P) equal to a width of a rear end of a feeder housing (35). A terminal end of a return conveyor (81) for returning of a second product communicates with the first treating chamber (D1).

25 Claims, 27 Drawing Sheets

OTHER PUBLICATIONS

Microfilm of the specification and drawings annexed to the request of Japanese Utility Model Application No. 16987/1983 (Laid–open No. 122035/1984) (Seirei Industry Co., Ltd.), Aug. 17, 1984.

Microfilm of the specification and drawings annexed to the request of Japanese Utility Model Application No. 129170/1983 (Laid–open No. 36041/1985) (Yanmar Agricultural Equipment Co., Ltd.), Mar. 12, 1985.

Microfilm of the specification and drawings annexed to the request of Japanese Utility Model Application No. 15013/1982 (Laid–open No. 117826/1983) (Yanmar Agricultural Equipment Co., Ltd.), Aug. 11, 1983.

* cited by examiner

GENERAL PURPOSE COMBINED HARVESTER AND THRESHER

FIELD OF THE ART

The present invention relates to a general purpose combined harvester and thresher (hereinafter, named "a general purpose combine" or simply "a combine") having auger type threshing rotors oriented perpendicularly to its travelling direction.

BACKGROUND ART

It is popular that a conventional general purpose combine comprises longitudinally oriented threshing rotors with screw vanes on their peripheral surfaces as augers provided in its thresh unit, wherein grain rods, which have been reaped by its reaping header forwardly projecting from its driving machine, are conveyed backward and fed into the thresh unit, so as to be threshed by the rotating rotors. Straws as the threshed grain rods are spread from the rear of the combine onto the field. Grains and chips of broken grain rods and dust are dropped through a screen into a separate unit disposed below the thresh unit. The separated chips of waste straw and dust are discharged from the rear of the combine, and the separated clean grains are gathered in a grain tank disposed on a side of the combine. When the grain tank is filled up, the grains can be discharged from the grain tank through an unloading tube disposed above the grain tank into a bed of a truck or the like. The unloading tube can be swivelled and lifted on the combine.

The grain rods which have been cut and separated from their roots by the header are conveyed backward through the feeder to the foremost end of the threshing rotor in the thresh unit. The rotor has been provided at its front end with a pickup vane for introducing the reaped grain rods deep into the thresh unit. However, the direction of introduced grain rods is substantially perpendicular to the rotational axis of the pickup vane, while the grain rods are to be conveyed in parallel to the axis of the rotor through the thresh unit. Therefore, the inlet of the thresh unit is hard to introduce the reaped grain rods so as to be often clogged with them.

Also, the grain rods with the lengths as they have been reaped are threshed insufficiently in the thresh unit.

Front and rear threshing rotors are provided with respective screens covering their lower portions so as to define the space between the front rotor and screen as a first threshing chamber, and the space between the rear rotor and screen as a second chamber. The grain rods can be transferred from the first threshing chamber to the second threshing chamber only through a pass formed between the laterally overlapping portions of the front and rear screens, so that each of the screens is insufficiently used, thereby causing another reason for the low efficiency of the thresh unit.

The distance which the thresh unit can provide for conveyance of grain rods to be threshed is restricted correspondingly to the lengths of rotors, thereby causing remains of unthreshed grain rods in significant number.

Also, if the thresh unit is fed with significantly increased grain rods from the reaping header, the layer of grain rods conveyed on the screen becomes so thick that only the grain rods abutting against the screen are threshed while those being close to the rotor are left unthreshed.

The problem of unthreshed grain rods caused by the large amount of reaped grain rods cannot be solved by an increase in the number of rotors for increasing the distance in conveyance of the grain rods to be threshed, which merely increases the power requirements for threshing, or rather causes, if the grain rods cannot be transferred between the rotors smoothly, the portion between the rotors clogged with the grain rods, and complicates the maintenance of rotors.

Furthermore, the disposal of plural rotors requires the thresh unit occupy such a large space as to restrict the volume of the grain tank.

The problem associated with the separate unit is that tailings as mixture of grains and twings generated therefrom are insufficiently treated for separating clean grains, thereby causing the loss of grains and reducing the quality of clean grains as products.

Also, conventionally, the tailings are returned onto the midway portion of a grain-flow pan of a shaking separator, so that the tailings to be separated are unevenly distributed on the pan, thereby reducing the efficiency of separation.

The problem associated with the arrangement of the reaping header, the thresh unit, the separate unit and the grain tank on the combine body is that the conventional combine is ill balanced in its lateral direction because the threshing rotor or rotors are longitudinally oriented at some length and the grain tank is disposed on either left or right side of the rotor or rotors. More specifically, at the beginning of work, the combine is more weighted at its one left or right side where the thresh and separate units are disposed than the other right or left side where the grain tank are disposed because the grain tank is empty. The centroid of the combine gradually moves to the grain tank side as the grains are collected step by step in the grain tank during the progress of work. Finally, when the grain tank becomes full of grains, the grain tank side of the combine becomes more weighted than the thresh and separate units side thereof. Thus, the position of centroid is different in the lateral direction between at the beginning of work and after the progress of work, thereby confusing an operator's feeling. What is worse, the combine, when the field is soft, is leaned laterally because of its lateral ill balance, so that the cutting level of reaped grain rods is different between the left and right halves of the combine.

The horizontal unloading tube for discharging grains from the grain tank is disposed above the grain tank, thereby complicating the mechanism for conveying grains from a grain elevator disposed under the grain tank to the horizontal unloading tube. Also, the horizontal unloading tube must be pivotally supported so strongly, thereby increasing the weight of the combine.

DISCLOSURE OF THE INVENTION

A general purpose combine of the present invention comprises a plurality of (particularly, two) auger type threshing rotors juxtaposed before and behind in its thresh unit, so that the reaped grain rods introduced into the thresh unit are successively threshed by the rotors, thereby solving the problem of leaving grain rods unthreshed.

Also, the rotary axis of at least one threshing rotor (especially, the axes of the two rotors) is oriented in the travelling direction of the combine, that is, perpendicularly to the direction of grain rods fed to the thresh unit, so that the grain rods introduced into the thresh unit are directly pressed against a screw vane provided on the peripheral surface of the first rotor, thereby improving the introduction of reaped grain rods into the thresh unit and reducing the longitudinal length of the combine. Furthermore, this construction enables the drive shaft of the rotor to be parallel to the drive shafts of augers disposed in a separate unit. Thus, bevel gears for reorientation of driving force are not required and the power transmission mechanisms for driving the shafts, which come to be collected on one side of the combine, are simplified, thereby saving costs.

A substantially rectangular slide framework is laterally slidably disposed in the thresh unit. The threshing rotor is journalled in the slide framework, so that the rotor together with the slide framework can be pulled out from the combine, thereby easing the maintenance and attachment of the rotor.

In the case of the thresh unit provided with two rotors, the rotational directions of the two rotors are made opposite to each other so that a layer of grain rods are reversed when they are transferred, whereby grain rods contacting one of the rotors are reversed so as to be pressed against the screen corresponding to the other rotor. Due to this, the combine is prevented from remaining of unthreshed grain rods however increased the grain rods to be threshed may be.

Furthermore, the front rotor is made outer diametrically larger than the rear rotor, so that they are allotted different functions. More specifically, the front rotor mainly threshes a lot of reaped grain rods introduced into the thresh unit so as to separate grains therefrom, and the rear rotor mainly conveys waste straws and secondarily separates remaining grains from the grain rods transferred from the front rotor, thereby saving consumption of driving power and lightening and compacting the thresh unit.

Tooth bars for cutting the grain rods introduced into the thresh unit are provided on a part of outer peripheral surface of the foremost threshing rotor which faces a feeder housing, thereby enhancing the efficiency of threshing.

Also, the pitch of the screw vane provided on the part of outer peripheral surface of the foremost rotor facing the feeder housing is made substantially as large as the width of the rear end of feeder housing, so that the grain rods from the feeder housing can be transferred from the part to the other part of the foremost rotor by its one rotation, whereby the part facing the feeder housing is prevented from being clogged with the introduced grain rods.

For transferring grain rods from a first threshing chamber underneath the front rotor to a second threshing chamber underneath the rear rotor, the rear rotor is rotated faster than the front rotor, so that the speed of grain rods conveyed by the rear rotor is higher than that by the front rotor, thereby reducing the thickness of layer of grain rods. As a result, sticking of grain rods in the screens, which causes some loss of grains, and jamming of grain rods between the rotors during the transferring thereof are prevented.

A terminal end of a tailing return conveyor extended from a tailing auger of the shaking separator is disposed so as to be connected to the head end of first threshing chamber, so that tailings from the tailing auger are threshed again by the first rotor so as to separate the grains from their twings, thereby enhancing the quality of clean grains as products.

Alternatively, the terminal end of tailing return conveyor extended from the tailing auger may be disposed so as to communicate with a laterally opposite space to the feeder housing in the thresh unit just above the upper surface of a grain-flow pan of the shaking separator, so that things to be separated are evenly spread on the whole of grain-flow pan, thereby enhancing the separation efficiency.

The grain tank is disposed above the thresh unit so that the grain tank can be laterally as wide as the combine body, thereby allowing the combine to be laterally evenly weighted however collected grains may be in the grain tank. Also, a bottom surface of the grain tank is disposed between the front and rear rotors so as not to move the weight point in the longitudinal direction even if the amount of grains in the grain tank is varied, thereby preventing the combine from unbalance.

Additionally, an unloading tube is disposed on either left or right side of the grain tank with its upstream end connected to a grain discharge conveyor disposed in the grain tank and with its terminal end forwardly projecting so as to reduce the transferring distance between the grain discharge conveyor and the unloading tube, thereby simplifying their driving and conveying mechanism and reducing the vertical length. Regarding the power transmission system, an engine is disposed behind the thresh unit so as to enhance the availability of a space below the driver's unit. The resulting engine can be disposed in substantially lateral middle of the rear portion of combine so as to enhance the lateral weight balance of the combine. Also, the rear-mounted engine is disposed oppositely to the front-mounted reaping header, thereby enhancing the longitudinal weight balance of the combine.

A transmission casing is also disposed below the rear-mounted engine, so as to enhance the longitudinal weight balance of the combine and reduce the power transmission distance between the engine and the transmission casing.

On one left or right side of the combine where an output shaft of the engine projects laterally outwardly are disposed all power transmission mechanisms associated with the transmission casing, the rotors in the thresh unit, an air fan and the like in the separate unit, a cutter bar and a feeding conveyor in the reaping header, and various conveyors or augers, thereby being simplified in the power transmission among them without bevel gears and easing their maintenance.

BEST MODE FOR CARRYING OUT THE INVENTION

FIGS. 1 through 11 show the basic embodiment of a general purpose combine A according to the present invention. At first, description will be given on the basic embodiment of general purpose combine A of the basic embodiment. The terms "left" and "right" are based on the advancing direction of combine A.

Figure 23:
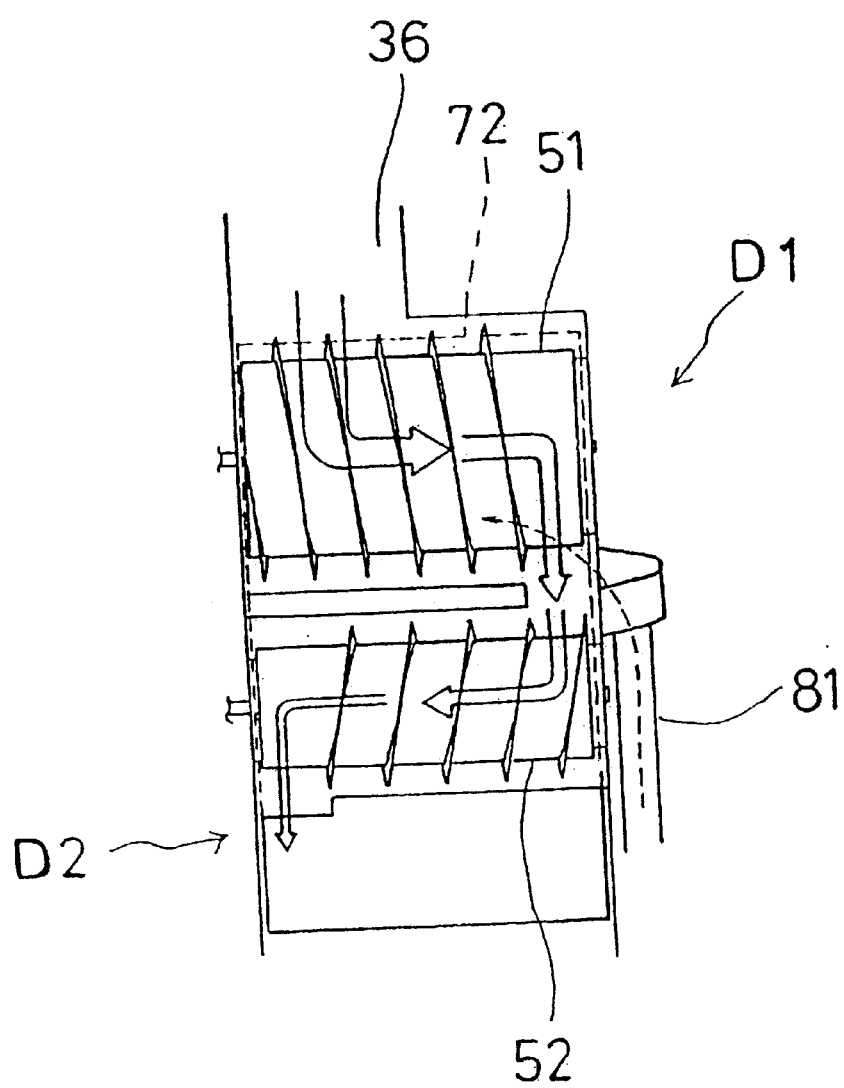
FIG. 23 is a plan view of the first and second threshing chambers according to an embodiment wherein the terminal ends of the return conveyor is connected to the upper surface of a grain-flow pan of the shaking separator in laterally opposite to the feeder housing.

A main body B is mounted on travelling units 1. A reaping header 3 and a feeder unit 4 are vertically movably disposed in front of main body B. FIG. 23 according to another embodiment discussed below shows that a lift cylinder 140 like a hydraulic or air cylinder serving as an example of an actuator for lifting reaping header 3 and feeder unit 4 is interposed between travelling units 1 and a feeder housing 35.

Figure 1:
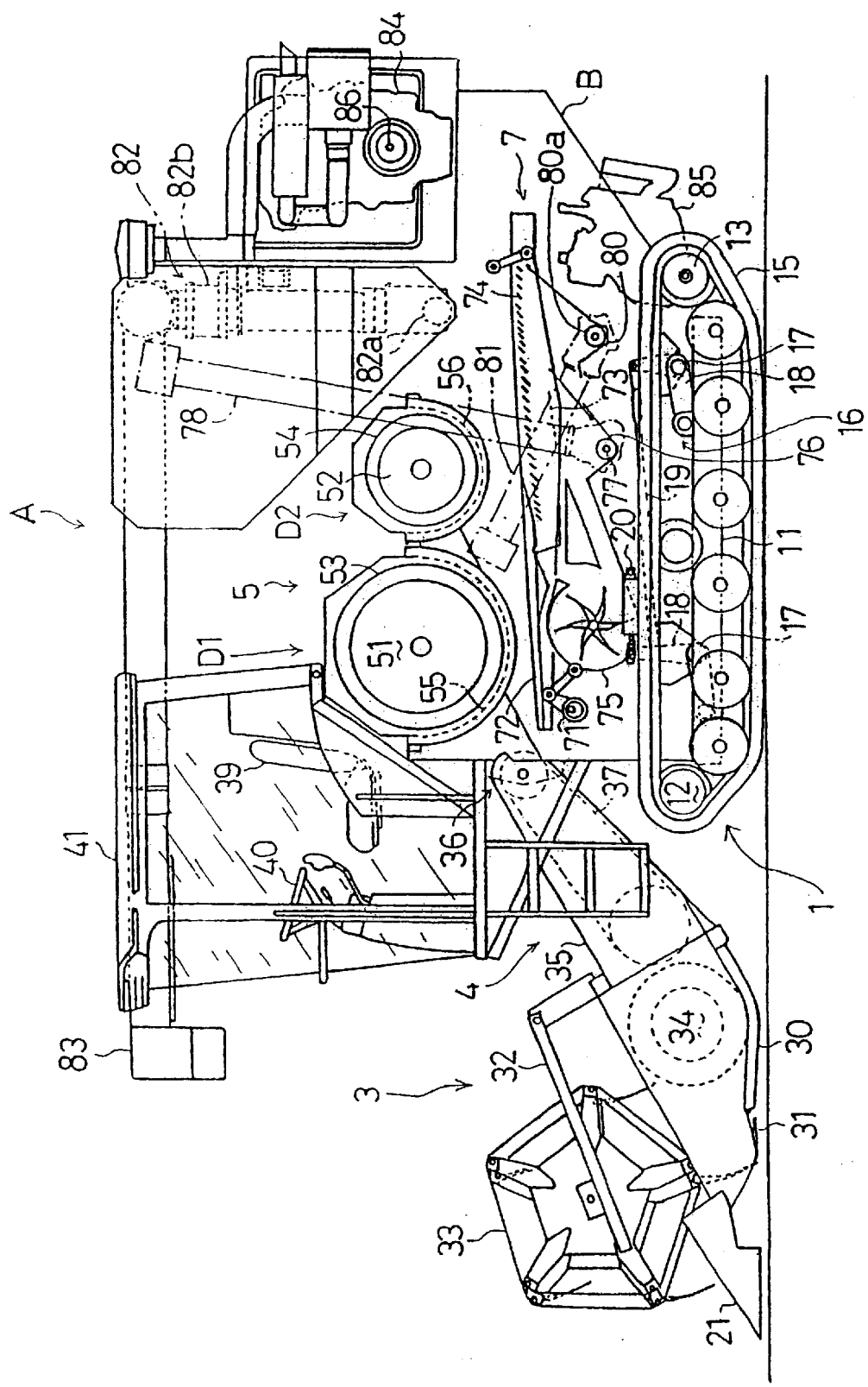
FIG. 1 is an entire side view of a general purpose combine showing the interior side view of its thresh unit according to a basic embodiment of the present invention.

Each of left and right travelling units 1, as shown in FIG. 1, comprises one of left and right track roller frames 11 provided at the front and rear ends thereof with a track idler 12 and a sprocket wheel 13 and at the bottom portion thereof with track rollers 14. Track idler 12, sprocket wheel 13 and track rollers 14 are bound with a track 15, thereby defining travelling unit 1 as a crawler type one.

Each of left and right tilting mechanisms 16 is interposed between main body B and each frame 11. Each tilting mechanism 16 comprises a pair of front and rear pivot shafts 17 laterally extended from the lower surface of main body B. A bending angle portion of a roughly L-like shaped lift arm 18 is pivotally provided onto each pivot shaft 17. The front ends of lift arms 18 are pivotally connected onto the front and rear portions of track roller frame 11. Additionally, a connecting rod 19 is interposed between the upper ends of lift arms 18, thereby making travelling unit 1 vertically movable in parallel to main body B. A hydraulic tilting cylinder 20 is interposed between the upper end of each first lift arm 18 and main body B, so that left and right track roller frames 11 are vertically moved independently to each other by expanding and contracting actions of respective tilting cylinders 20, thereby holding main body B horizontal even when one of left and right travelling units 1 falls in the mire. Hydraulic tilting cylinder 20 may be replaced with an air cylinder or the like.

For reaping header 3, a cutter bar 31 is provided on a front edge of a platform 30. A pickup reel 33 is disposed above cutter bar 31 while a lifting link 32 are interposed between pickup reel 33 and platform 30, so that standing grain crops are cut by cutter bar 31 and introduced into platform 30. A rotating auger 34 is laterally extended in platform 30 so as to collect the reaped grain rods to a somewhat leftward portion of platform 30. A reference numeral 21 designates a divider.

For feeder unit 4, a feeder housing 35 which is connected at its front end to the rear surface of reaping header 3 corresponding to the position where the reaped grain rods are collected. The rear end of feeder housing 35 is vertically rotatably joined to a grain rod inlet 36 of a thresh unit 5 discussed below, so that the reaped grain rods are carried into thresh unit 5 by a conveyor 37 in feeder housing 35. A hydraulic lift cylinder is interposed between the bottom of feeder housing 35 and main body B, so that reaping header 3 and feeder 4 are lifted and lowered by its expanding and contracting actions.

A cab 41, including a driver's seat 39, a steering wheel 40 and the like, fixed on main body B is disposed above feeder housing 35. Cab 41 disposed on the lateral middle upper portion of main body B ensures nice visibility. Especially, a driver therein can get a fine view before reaping header 3, thereby easily recognizing the reaping condition. In this embodiment, feeder housing 35 is disposed on a left side of cab 40.

Thresh unit 5 is disposed behind cab 41. As shown in FIGS. 1 through 5, a diametrically larger first threshing rotor 51 and a diametrically smaller second threshing rotor 52 are disposed while their axes are horizontal and perpendicular to the travelling direction of combine A. More than three threshing rotors may be disposed so as to increase the threshing distance. Rotor 51 is provided at the outer peripheral surface thereof with a first screw vane 53, and rotor 52 with a second screw vane 54. The lower portion of rotor 51 is covered with a first screen 55 which is spaced from the outer edge of screw vane 53, so as to serve the space between rotor 51 and screen 55 as a first threshing chamber D1. Also, the lower portion of rotor 52 is covered with a second screen 56 which is spaced from the outer edge of screw vane 54, so as to serve the space between rotor 52 and screen 56 as a second threshing chamber D2. A partition wall 57 is disposed between first and second rotors 51 and 52. A rear wall 58 is disposed behind second rotor 52. A transferring passage 59 is disposed off a right side end of partition wall 57. A waste-straw outlet 60 is disposed off a left side end of rear wall 58.

Figure 6:
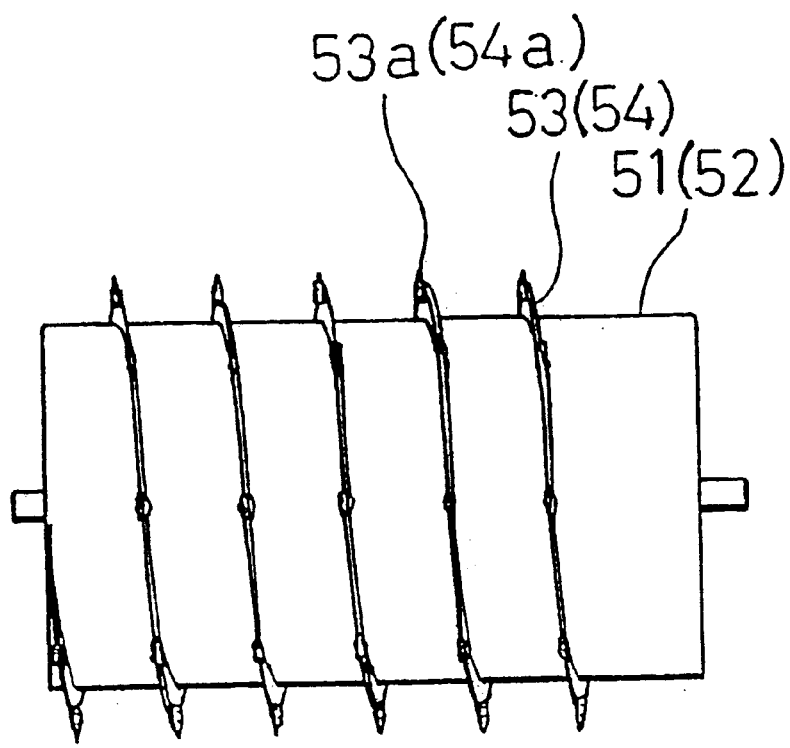
FIG. 6 is a side view of a threshing rotor.
Figure 7:
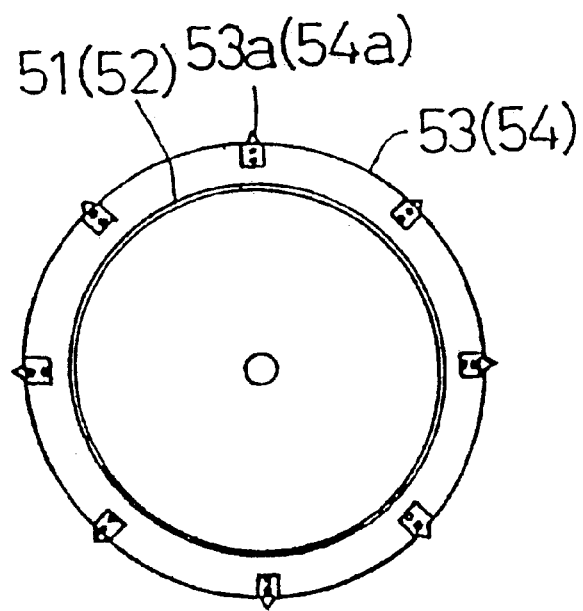
FIG. 7 is a front view of the same.

As shown in FIGS. 6 and 7, a lot of rasp bars 53*a* project from the outer ends of first and second screw vanes 53 and 54 for effectively cutting the grain rods.

Figure 8:
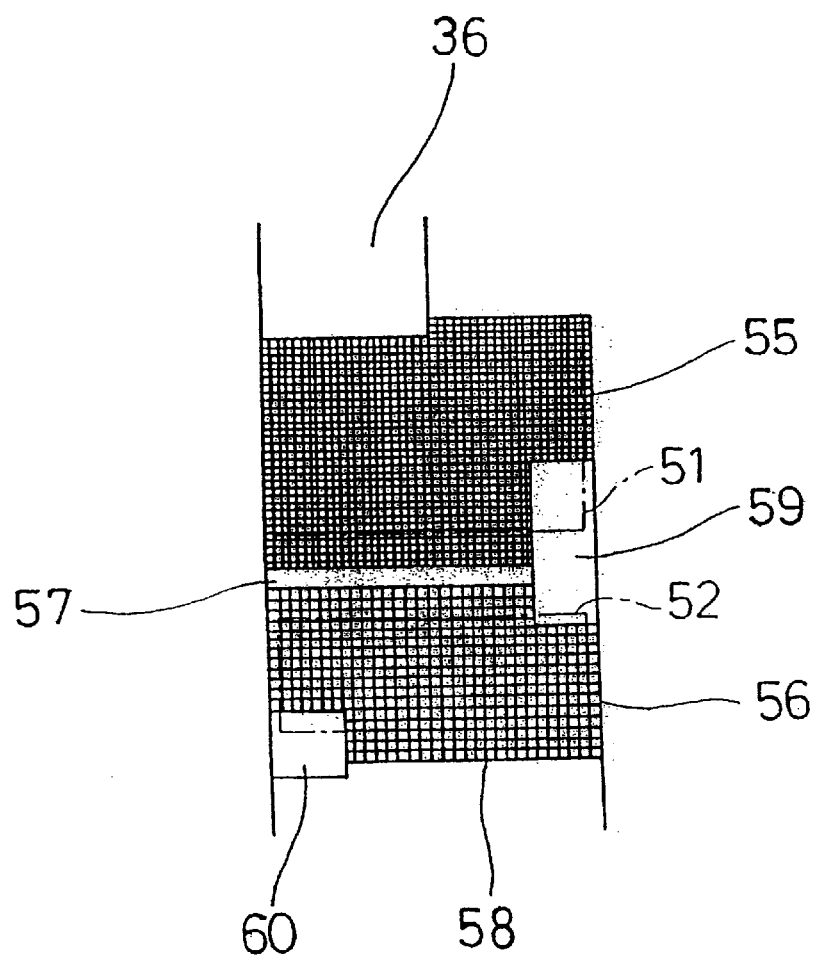
FIG. 8 is a plan view of screens.

As shown in FIG. 8, the meshes of first screen 55 is made smaller than those of second screen 56, thereby preventing the grains with twings on from falling into a shaking-separator unit 7 and saving the power required for threshing.

Figure 9:
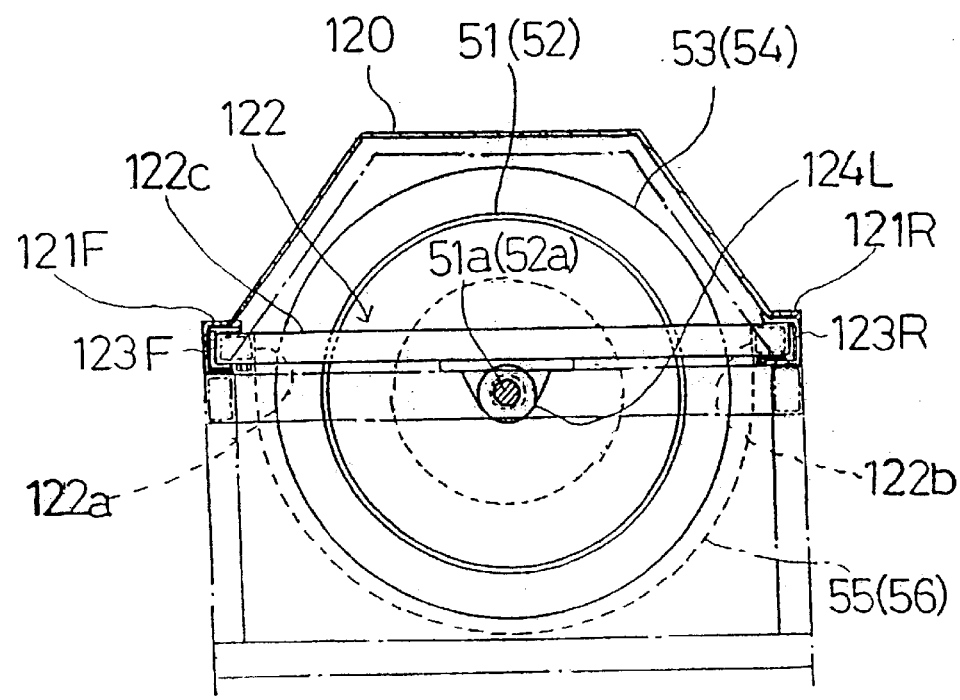
FIG. 9 is a side view of a mechanism for slidably supporting the threshing rotor.
Figure 10:
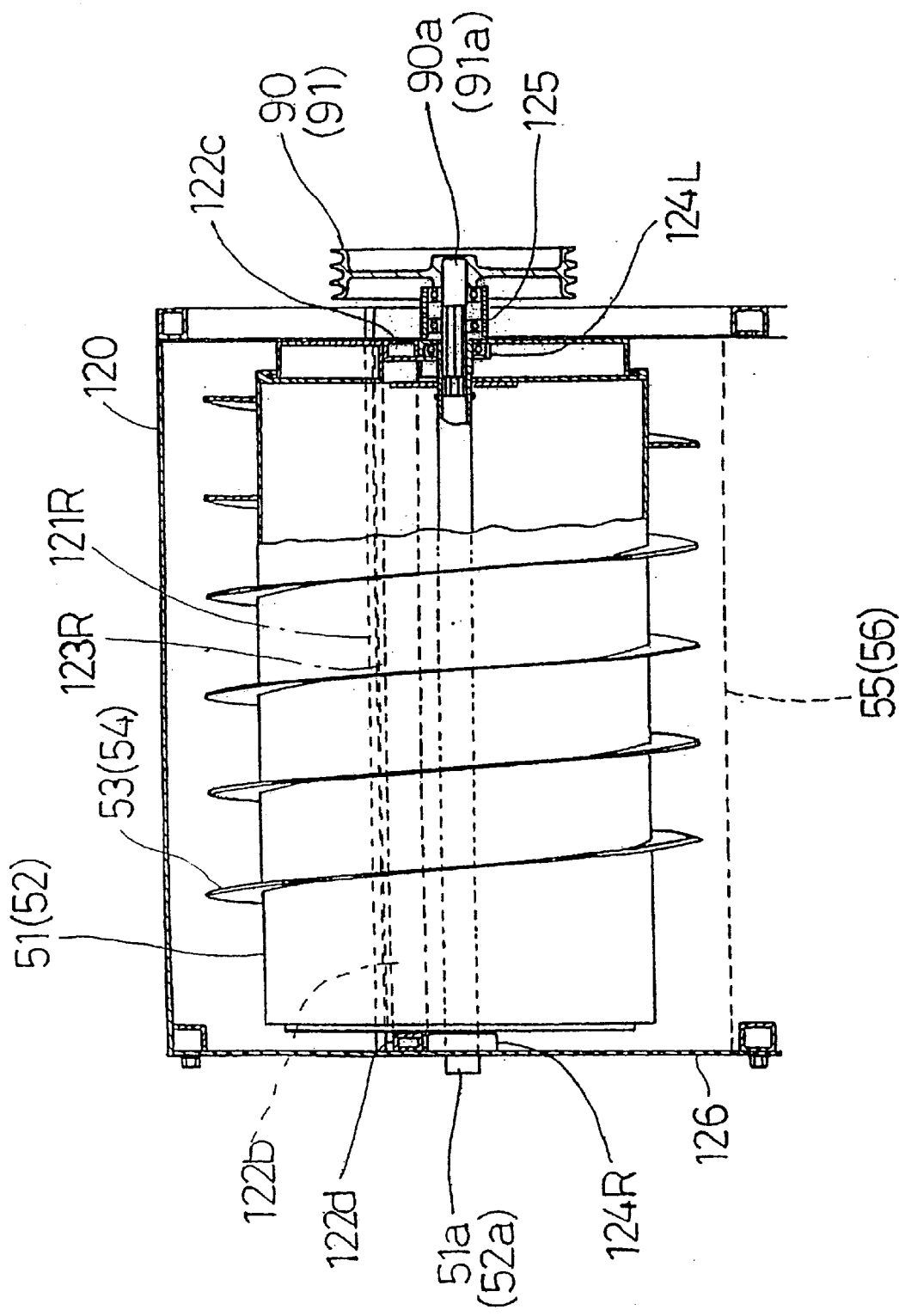
FIG. 10 is a front view of the same.
Figure 11:
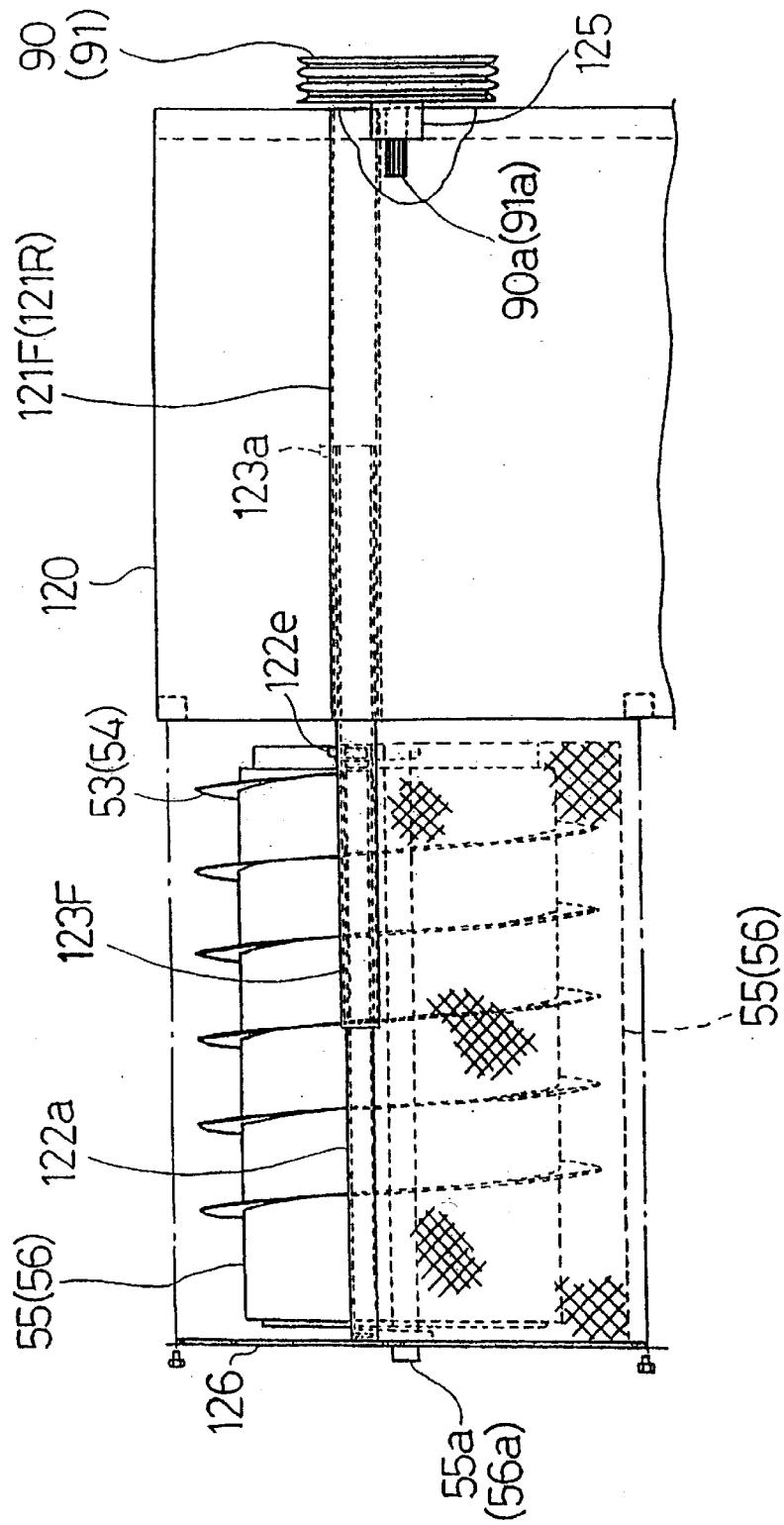
FIG. 11 is a front view of the same in the condition that the rotor has been slidden outward.

For attaching and detaching the rotors and screens, as shown in FIGS. 9 through 11, a threshing chamber cover 120, whose interior is defined as either first or second chamber D1 or D2, disposed in thresh unit 5 is provided at the front and rear ends thereof with laterally extended respective front and rear slide rails 121F and 121R, each of which looks like an inwardly open U-shape turned sideways when viewed in sectional side. Front and rear relay slide frames 123F and 123R, each of which similarly looks like an inwardly open U-shape turned sideways When viewed in sectional side, are laterally slidably inserted into respective front and rear slide rails 121F and 121R. A slide framework 122, which looks rectangular when viewed in plan, is provided at the front and rear portions thereof with respective frames 122*a* and 122*b* so as to be laterally slidably inserted into respective relay slide frames 123F and 123R. Screen 55 (56) is fixedly interposed in a U-like shape when viewed between front and rear frames 122*a* and 122*b*.

A left frame 122*c* of framework 122 is provided at the longitudinal middle thereof with a left bearing 124L into which a left end of a rotor shaft 51*a* (52*a*) laterally axially passing through rotor 51 (52) is journalled. Similarly, a right frame 122*d* of framework 122 is provided at the longitudinal middle thereof with a right bearing 124R into which a right end of rotor shaft 51*a* (52*a*) is journalled.

A bearing 125 is disposed on one side (in this embodiment, a left side) surface of threshing chamber cover 120 facing bearing 124L. An input shaft 90*a* (91*a*) inwardly projecting from the center of rotor pulley 90 (91) is detachably inserted into bearings 125 and 124L from the exterior of threshing chamber cover 120, so that the inward end of input shaft 90*a* (91*a*) engages with the left end of rotor 51*a* (52*a*) through a spline. A side plate 126 having a vertical surface is fixed onto the outer surface of right frame 122*d* of slide framework 122. Rotor shaft 51*a* (52*a*) and input shaft 90*a* (91*a*) are made to engage with each other so that rotor 51 (52) is located to the fixed position in threshing chamber cover 120 and fixed onto the right surface of threshing chamber cover 120 with screws.

As shown in FIG. 11, rotor 51 (52) can be laterally slidden together with slide framework 122 along slide rails 121F and 121R outwardly from the right side opening of threshing chamber cover 120 after the screws are removed so as to remove side plate 126 from threshing chamber cover 120. Even if rotor 51 (52) is wholly removed from thresh cover 120, front and rear frames 122*a* and 122*b* of slide framework 122 still engage with slide rails 121F and 121R through relay slide frames 123F and 123R. Therefore, removed rotor 51 (52) can be slidden to the original position in cover 120 soon after its repair for maintenance.

Stopper pins 122*e* are fixedly provided on the left upper ends of front and rear frames 122*a* and 122*b*, so as to be engaged in grooves formed by the upper surfaces of relay slide frames 123F and 123R, respectively. Similarly, stopper pins 123*a* are fixedly provided on the left upper ends of relay slide frames 123F and 123R, so as to be engaged in grooves formed by the upper surfaces of slide rails 121F and 121R, respectively. Stopper pins 122*e* come to abut against the ends of grooves of relay slide frames 123F and 123R when slide framework 122 reaches the final position of its slidable range, thereby preventing slide framework 122 from an escape from relay slide frames 123F and 123R. Similarly, stopper pins 123*a* come to abut against the ends of grooves of slide rails 121F and 121R when relay slide frames 123F and 123R reach the final positions of their slidable ranges, thereby preventing relay slide frames 123F and 123R from an escape from slide rails 121F and 121R.

Rotor 51 (52) and screen 55 (56) can be eased in their attachment and maintenance due to their laterally slidable construction as the above-mentioned. Rotor 51 (52) may be laterally exchanged in its support. More specifically, rotor pulley 90 (91) may be disposed on the right side of rotor 51 (52) so as to enable rotor 51 (52) to slide out from a left opening of threshing chamber cover 120.

Figure 3:
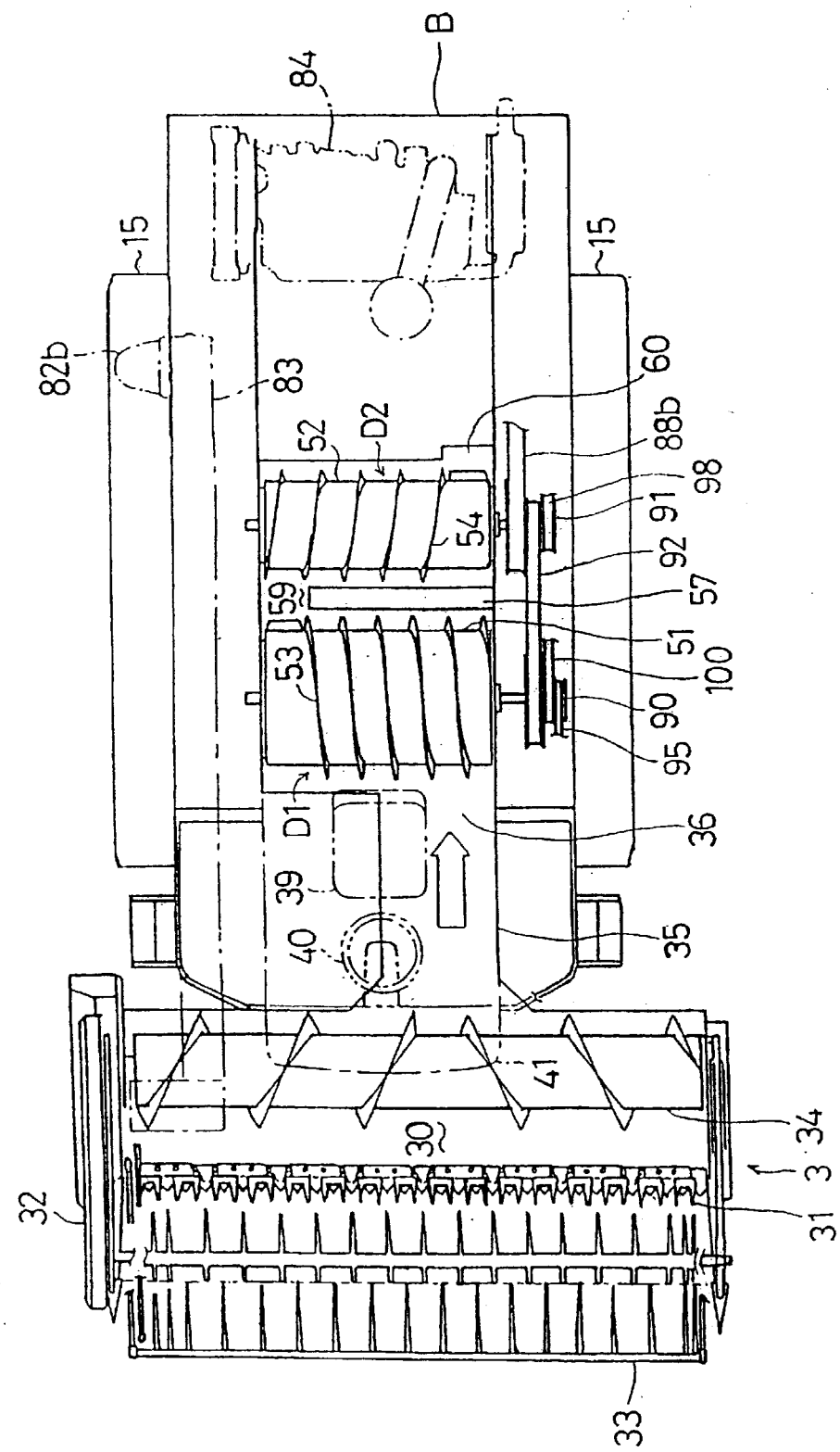
FIG. 3 is an entire plan view of the same showing the interior plan view of the thresh unit.
Figure 4:
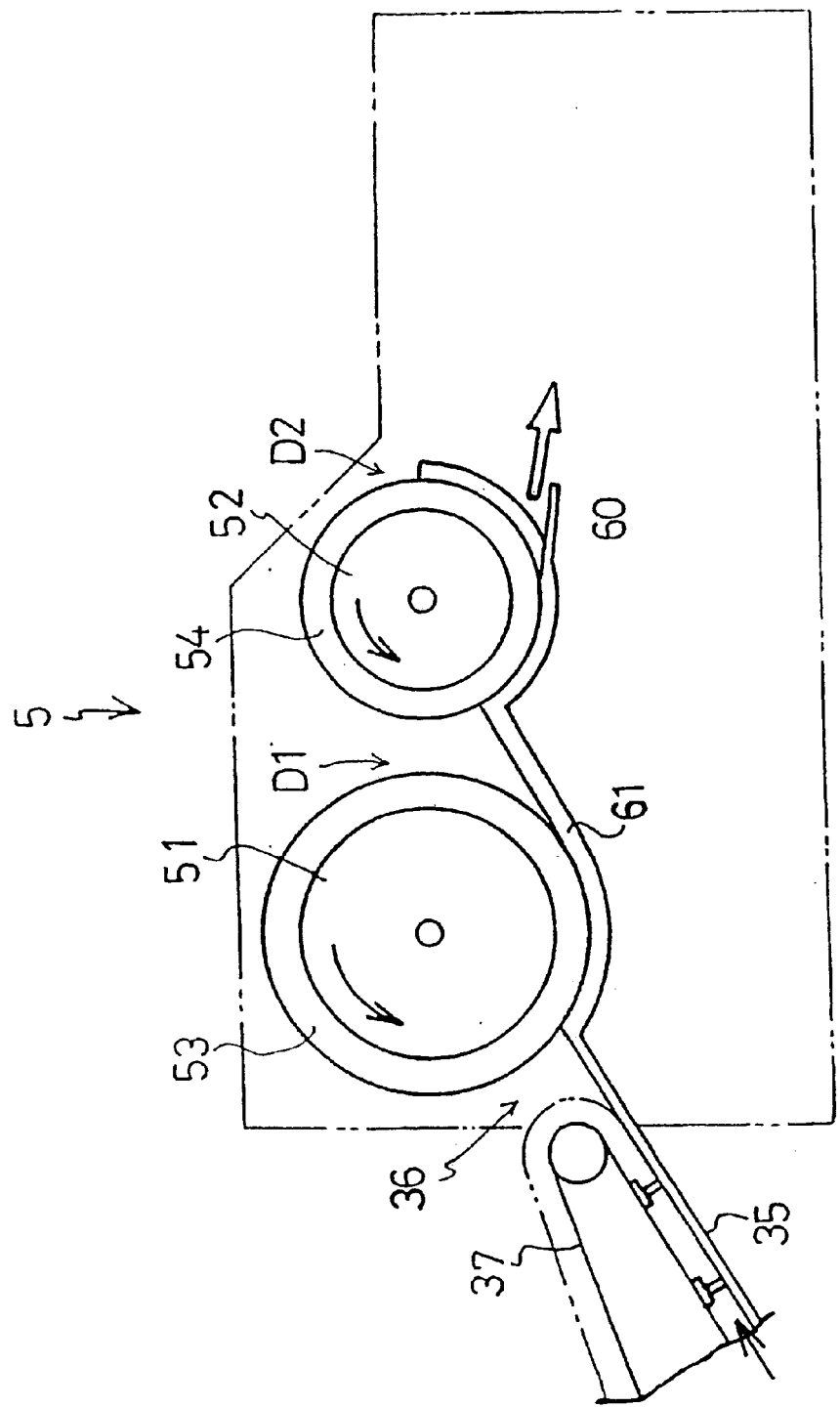
FIG. 4 is a side view of the thresh unit.
Figure 5:
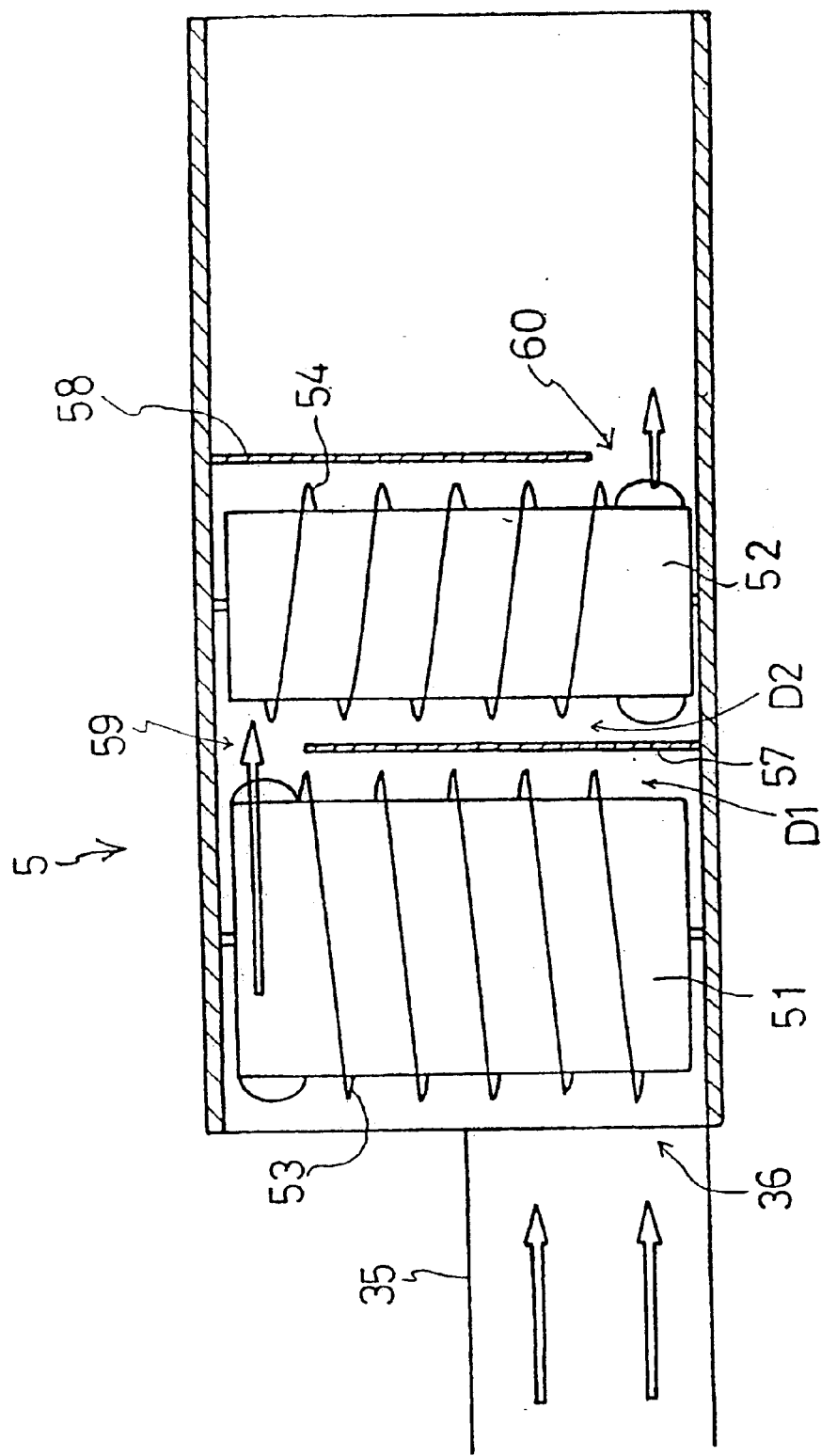
FIG. 5 is a plan view of the same.

As the above mentioned, as shown in FIGS. 3 to 5, thresh unit 5, which comprises rotor 51 and screen 55 forming threshing chamber D1 and rotor 52 and screen 56 forming threshing chamber D2, is fed with reaped grain rods through grain rod inlet 36 from feeder housing 35 disposed on a somewhat left side portion of combine A. The reaped grain rods are introduced onto first screen 55 and carried rightward thereon while being threshed by rotation of first rotor 51. And then, they are transferred onto -second screen 56 through passage 59 and carried leftward in-opposite to the above and threshed by rotation of second rotor 52. During the threshing, grains mixed with chaff and dust fall through first and second screens 55 and 56 into shaking separate unit 7.

The waste straw rods remaining on first and second screens 55 and 56 are exhausted from waste-straw outlet 60. In sum, a threshing route 61 is provided between grain rod inlet 36 and waste-straw outlet 60 through first and second screens 55 and 56.

According to this embodiment, as detailed in the power transmission mechanism discussed below, first and second rotors 51 and 52 are rotated in the same direction. In correspondence to this, the winding directions of screw vane 53 on rotor 51 is made opposite to that of screw vane 54 on rotor 52, as shown in FIGS. 3 to 5, thereby enabling the grain rods to be transferred while being laterally reversed in the direction of their carriage for threshing as the above mentioned.

Since first and second threshing rotors 51 and 52 in thresh unit 5 are rotated in the same direction in cooperation with their mechanism regarding their shapes and rotary speeds, the reaped grain rods introduced from left-of-center grain rod inlet 36 are successively transferred smoothly from first rotor 51 to second rotor 52, whereby they are introduced from grain rod inlet 36 onto first screen 55 smoothly.

The reaped grain rods are completely threshed in two steps while being carried laterally by first and second rotors 51 and 52. More specifically, diametrically different rotors 51 and 52 are allotted different functions. For example, first rotor 51 is made diametrically larger than second rotor 52 so that first rotor 51 mainly introduces and threshes grain rods and second rotor 52 mainly conveys waste straws. This is advantageous in saving power required for threshing, and in compacting and lightening thresh unit 5 so as to compact the whole of combine A.

Additionally, the peripheral speed of second rotor 52 is set higher than that of first rotor 51 so as to reduce unthreshed remains. Resulting second rotor 52 conveys grain rods so fast as to reduce the thickness of layer of the conveyed things, thereby preventing grains from sticking in the screens.

In this regard, first rotor 51 cannot be rotated so fast for prevention of hulling, which reduces the quality of threshed things, caused by rotation of first rotor 51 at high peripheral speed.

Since first and second rotors 51 and 52 are disposed so as to thresh the introduced grain rods successively, thereby preventing the loss of grains caused by leaving grain rods unthreshed or the like. Also, since first and second rotors 51 and 52 are disposed perpendicularly to the travelling direction of combine A, combine A can be made longitudinally short in spite of the further extended threshing course. Diametrically large first rotor 51 disposed in perpendicular to the direction of reaped grain rods introduced from feeder housing 35 effects fine introduction of the reaped grain rods into thresh unit 5.

Diametrically small second rotor 52 can completely thresh all remaining unthreshed grain rods down to those sticking in screen 56, thereby preventing the grains from being mixed with waste straws to be discharged.

A shaking separate unit 7 is disposed below thresh unit 5. As shown in FIG. 1, shaking thresh unit 7 comprises a grain-flow pan 72, a grain sieve 73, a chaff sieve 74 and the like, all of which are rotated together by a shaking mechanism 71, and an air fan 75 disposed below grain-flow pan 72. The mixture of grains, chaff and dust dropped on grain-flow pan 72 from thresh unit 5 are divided into grains with dust and chaff by grain sieve 73. The chaff is discharged out of combine A from waste-straw outlet 60. A clean grain auger 77 is disposed along in a lateral first gutter 76 formed below grain sieve 73. A grain elevator 78 as an auger in a grain elevator tube is erected from the terminal end of first gutter 76 into grain tank 79. Clean grains are conveyed and collected into grain tank 79 through clean grain auger 77 and grain elevator 78. A lateral second gutter 80 is formed below chaff sieve 74 behind grain sieve 73. A tailing auger 80a is disposed along in second gutter 80. A tailing return conveyor 81 is extended from the terminal end of second gutter 80 so as to drive in succession to tailing auger 80a. The terminal end of tailing return conveyor 81 is located in a front portion of shaking separate unit 7, that is, just above grain-flow pan 72, so that the tailings in the grain mixture are returned to the front portion of shaking separate unit 7 (on grain-flow pan 72) through tailing auger 80a and tailing return conveyor 81.

Grain tank 79, as shown in FIG. 1, is formed in a roughly inverted triangle shape from above the front end of second rotor 52 to above the rear end of shaking separate unit 7. A grain discharge conveyor 82 is so constructed that a grain discharge auger 82a is laterally extended in the bottom of grain tank 79 and a grain discharge elevator 82b is provided upright from the terminal end of grain discharge auger 82a. Unloading tube 83 is pivotally connected at its upstream end to the terminal end of grain discharge auger 82a, thereby enabling the terminal end of unloading tube 83 to be positioned in all directions for availing to unload the grains in grain tank 79 onto a bed of a truck or the like. Unloading tube 83 is substantially horizontally disposed at ordinary times.

Figure 25:
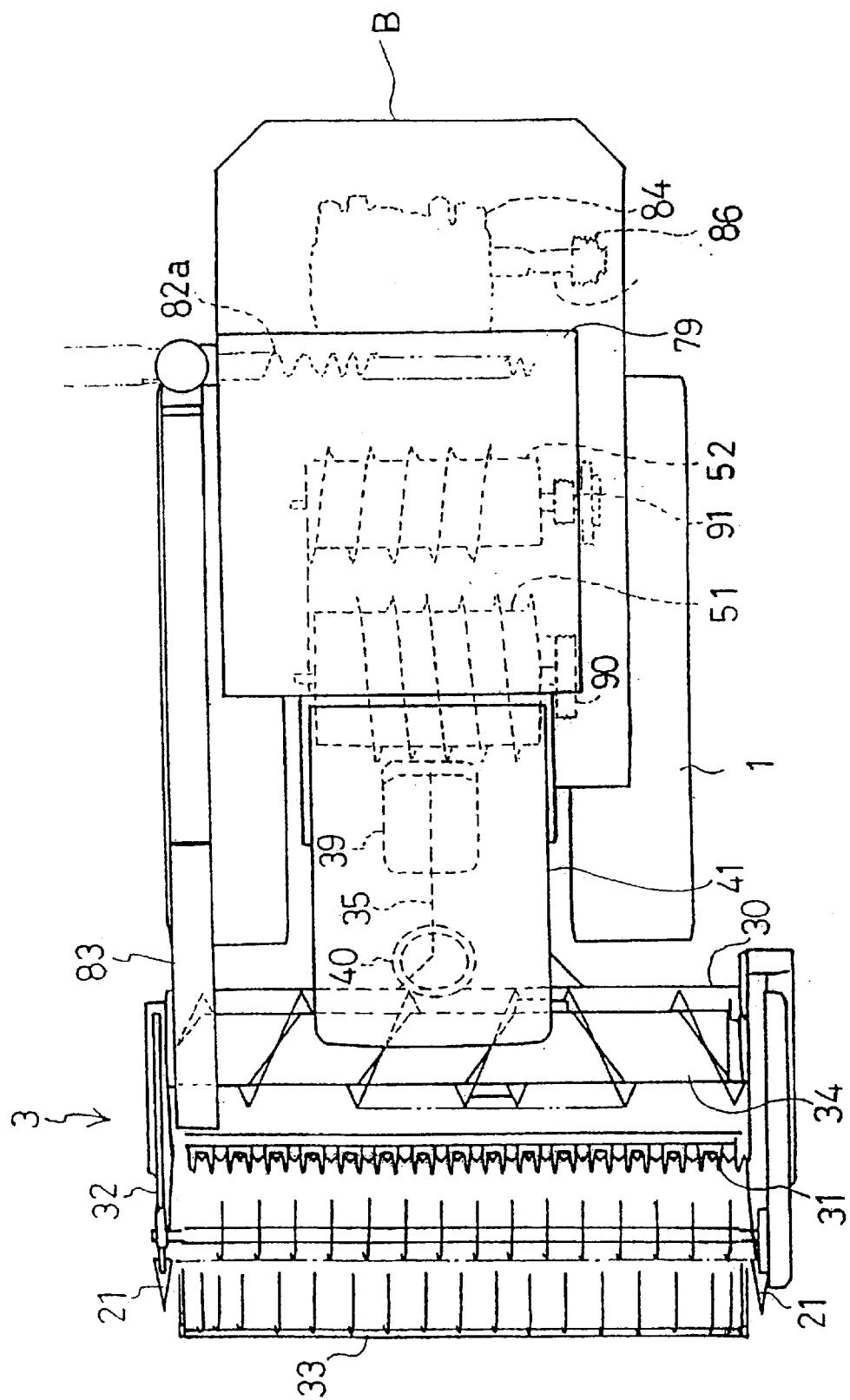
FIG. 25 is an entire plan view of the same showing the entire plan view of the thresh unit.
Figure 26:
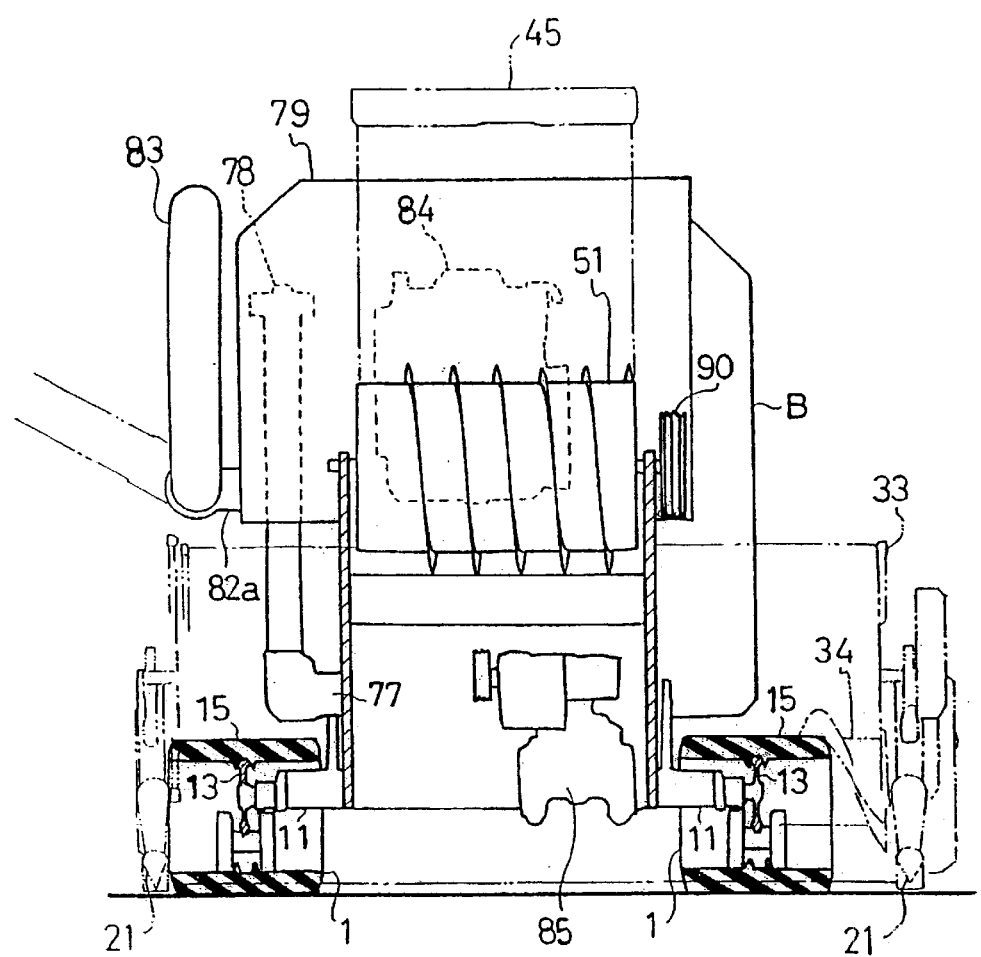
FIG. 26 is an entirely sectional front view of the same.

The width of grain tank 79, as shown in FIGS. 25 and 26 and discussed below, is preferably substantially as large as or larger than that of thresh unit 5, so that the centroid of combine A does not move in the lateral direction of combine A whether grain tank 79 is full of grains or not.

Behind grain tank 79, or behind thresh unit 5 is disposed an engine 84. A transmission casing 85 is disposed under engine 84. Due to the disposal of engine 84 behind thresh unit 5, a free space below cab 41 can be expanded. Also, cab 41 and engine 84 can be disposed in substantially lateral middle of combine A, without being laterally eccentric, thereby greatly balancing the weight of combine A in its lateral direction. Additionally, combine A is balanced in weight in its longitudinal direction because engine 84 is disposed at the rear of combine while reaping header 3 is oppositely disposed at the front thereof.

Furthermore, the disposal of transmission casing 85 below engine 84 also improves the weight balance of combine A in its longitudinal direction and shortens the distance of power transmission from engine 84 to transmission casing 85.

Next, description will be given on the power transmission system from engine 84 in general purpose combine A of the basic embodiment in accordance with FIG. 2.

On output shaft 86 projecting on one lateral (in this embodiment, left) side of engine 84 is fixed an engine output pulley 87. On the same (left) side of combine A with the projectional side of output shaft 86 are disposed a first rotor pulley 90 and a second rotor pulley 91 as multiple pulleys, which are fixed onto respective rotary shafts of first rotor 51 and second rotor 52. A relay pulley 89 as a multiple pulley is rotatably disposed between second rotor pulley 91 and engine output pulley 87. An open rotor drive belt 88a is interposed between pulleys 87 and 89, an open rotor drive belt 88b is between pulleys 89 and 90, and an open rotor connection belt 92 is between pulleys 91 and 90, thereby rotating first and second rotors 51 and 52 in the same direction.

Furthermore, a reaping-and-feeding input pulley 94 is provided on a reaping-and-feeding drive shaft 93 journalled in the rear end portion of feeder housing 35, and a reaping-and-feeding drive belt 95 is interposed between first rotor pulley 90 and reaping-and-feeding input pulley 94, so that cutter bar 31 and rotating auger 34 in reaping header 3, and feeder conveyor 37 in feeder unit 4 drivingly follow first and second rotors 51 and 52. Second rotor pulley 91, a clean grain auger drive pulley 96 and a tailing auger drive pulley 97 are interconnected through an auger drive belt 98. Clean grain auger 77 and grain elevator 78 are driven by rotation of pulley 96, and tailing auger 80 and tailing return conveyor 81 are driven by rotation of pulley 97. A separator input pulley 99 is drivingly connected with first rotor pulley 90 through a shaking separator drive belt 100 so as to drive shaking separate unit 7, more specifically, to rotate air fan 75 and integrally shake grain-flow pan 72, grain sieve 73 and chaff sieve 74 through shaking mechanism 71.

Furthermore, a grain discharge drive belt 102 is interposed between engine output pulley 87 and a grain discharge drive pulley 101, so as to transmit the output power of engine 84 to grain discharge conveyor 82. A drive belt 103 is interposed between pulley 87 and a drive input pulley 104 projecting on either left or right side of transmission casing 85, so as to drive sprocket wheels 13 of travelling units 1.

Figure 2:
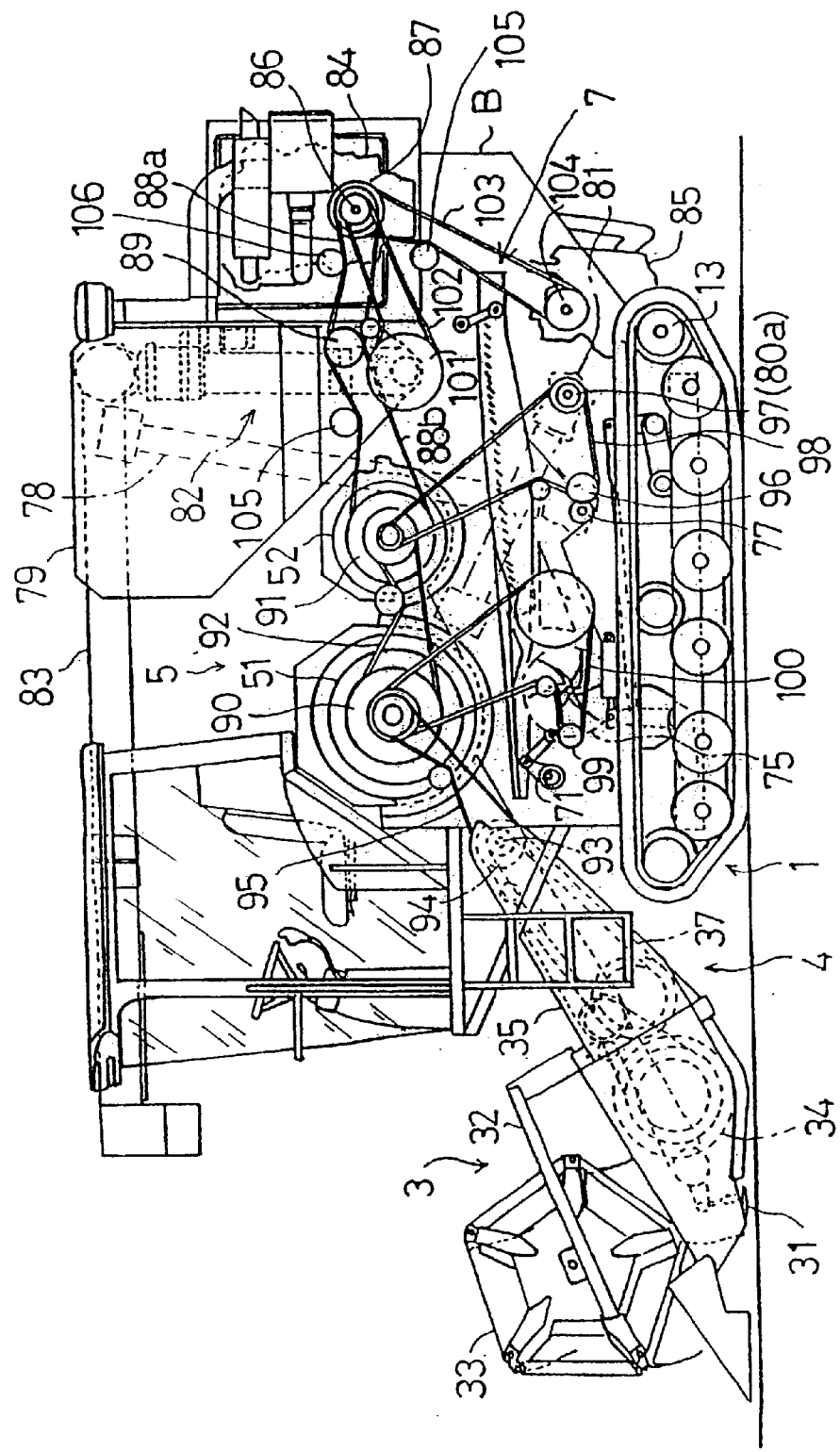
FIG. 2 is an entire side view of the same showing the power transmission system in the case that the first and second rotors are rotated in the same direction.

In FIG. 2, each reference numeral 105 designates a tension clutch, and each reference numeral 106 designates a tension pulley. In combine A, driving of tracks, that of reaping-and-threshing-and-separating, and that of unloading grains are made to interact with one another and to separate from one another by engaging and disengaging tension clutch 105.

In the above-mentioned power transmission system, pulleys and belts may be replaced with sprockets and chains.

As the above-mentioned, all of reaping header 3, feeder conveyor 37, thresh unit 5, shaking separate unit 7, devices for discharging grains and track driving system receive power from output shaft 86 of engine 84 through the power transmission system on the same left or right (in this embodiment, left) side with projectional side of output shaft 86. The transmission system is simplified and the power loss through the system is reduced because it includes no bevel gears for reorientation of power transmission.

The first embodiment of general purpose combine A has been described hitherto. Hereinafter, description will be given on various embodiments as modifications of various parts such as the thresh unit, the grain tank, the augers and conveyors referring to the drawings.

At first, description will be given on each of embodiments regarding thresh unit 5 shown in FIGS. 12 through 19.

Figure 12:
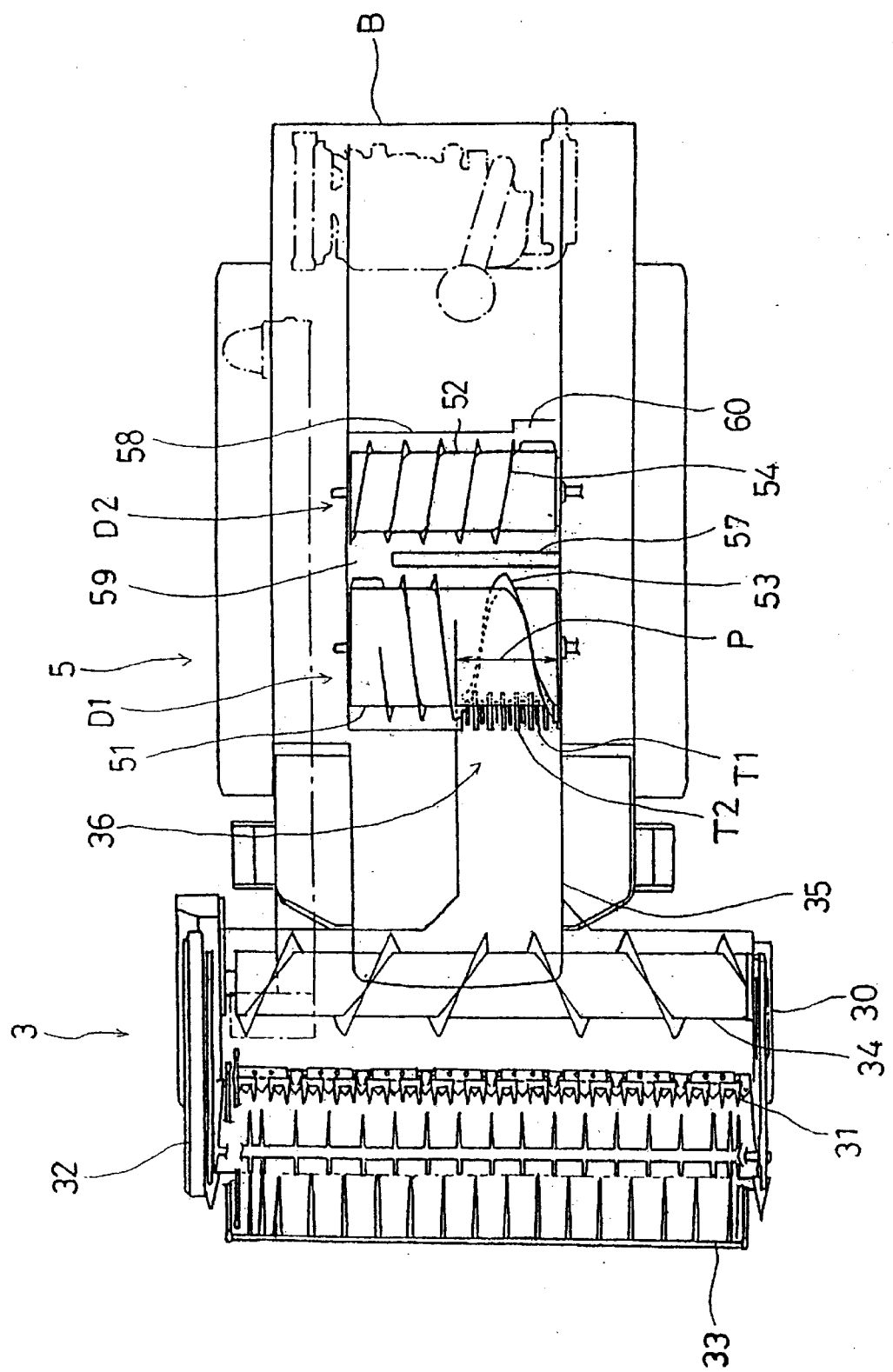
FIG. 12 is an entire plan view of the general purpose combine showing the interior plan view of the thresh unit, according to an embodiment wherein the thresh unit is provided at a grain rod inlet thereof with tooth bars.
Figure 13:
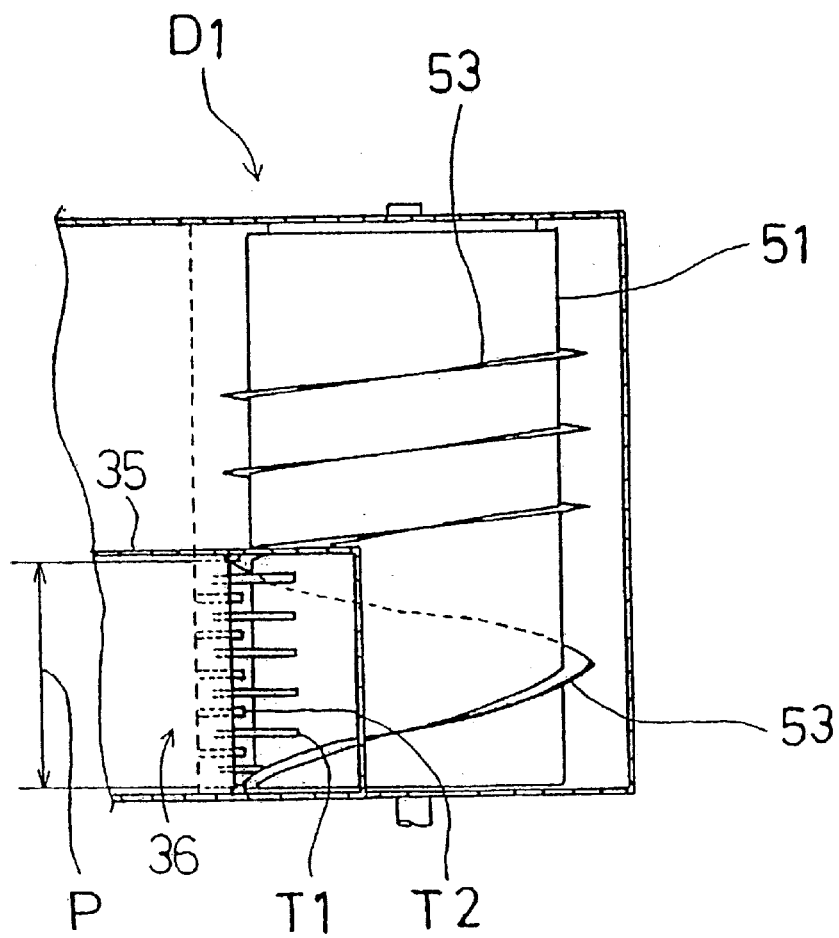
FIG. 13 is a fragmental plan view of the grain rod inlet according to the same embodiment.
Figure 14:
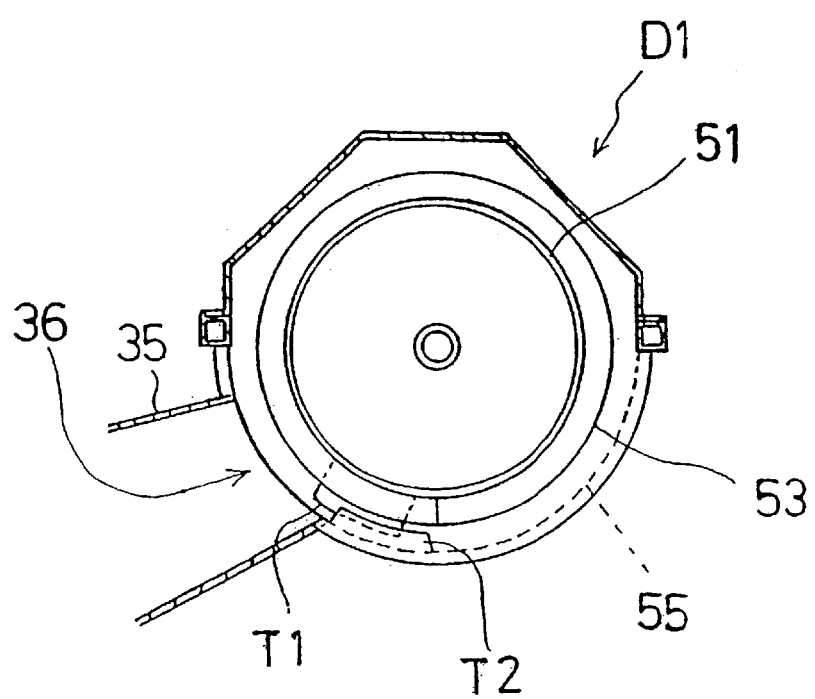
FIG. 14 is a fragmental side view of the same.

Referring to each of FIGS. 12 through 14, a preventive mechanism against clogging of grain rod inlet 36 is provided at grain rod inlet 36 in front of first threshing chamber D1 for conveying the grain rods through thresh unit 5 smoothly. On a part of outer surface of first rotor 51 facing feeder housing 35, that is, grain rod inlet 36 are provided tooth bars T1 roughly looking like teeth of a comb. Fixed tooth bars T2 roughly looking like teeth of a comb are provided on a lower edge of grain rod inlet 36 in correspondence to respective tooth bars T1, so that each of tooth bars T1 is disposed adjacent to each of tooth bars T2. As a result, the grain rods introduced from feeder housing 35 into thresh unit 5 are chopped by rotation of first rotor 51 so as to enhance the capacity of threshing and to smooth the movement of grain rods during the proceeding of threshing.

Additionally, as shown in FIGS. 12 and 13, a pitch P of a part of first screw vane 53 provided on a part of outer surface of first rotor 51 facing feeder housing 35, that is, grain rod inlet 36 is as large as the lateral width of grain rod inlet 36, so that the grain rods from grain rod inlet 36 are carried rightward by one rotation of first rotor 51, thereby preventing this area from being clogged with the grain rods.

Figure 15:
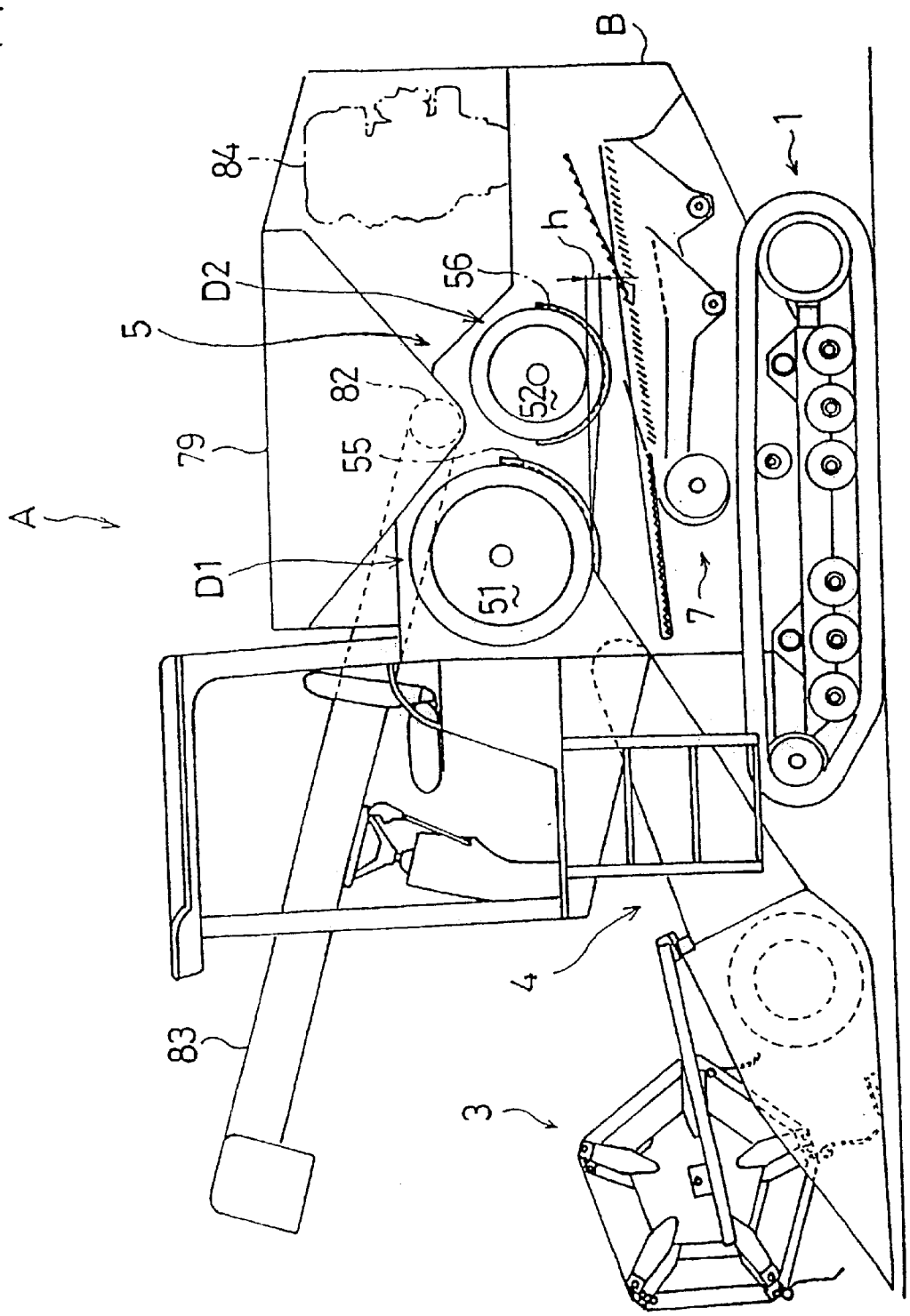
FIG. 15 is an entire side view of the general purpose combine according to an embodiment wherein the bottom end of a second threshing chamber D2 is disposed lower than that of a first threshing chamber D1.

FIG. 15 shows an embodiment for smoothing the transference of grain rods from first chamber D1 to second chamber D2. In this embodiment, the lowest end of first screen 55 is positioned lower at a vertical difference h than that of second screen 56, thereby smoothing the transference of grain rods from first rotor 51 to second rotor 52.

Figure 16:
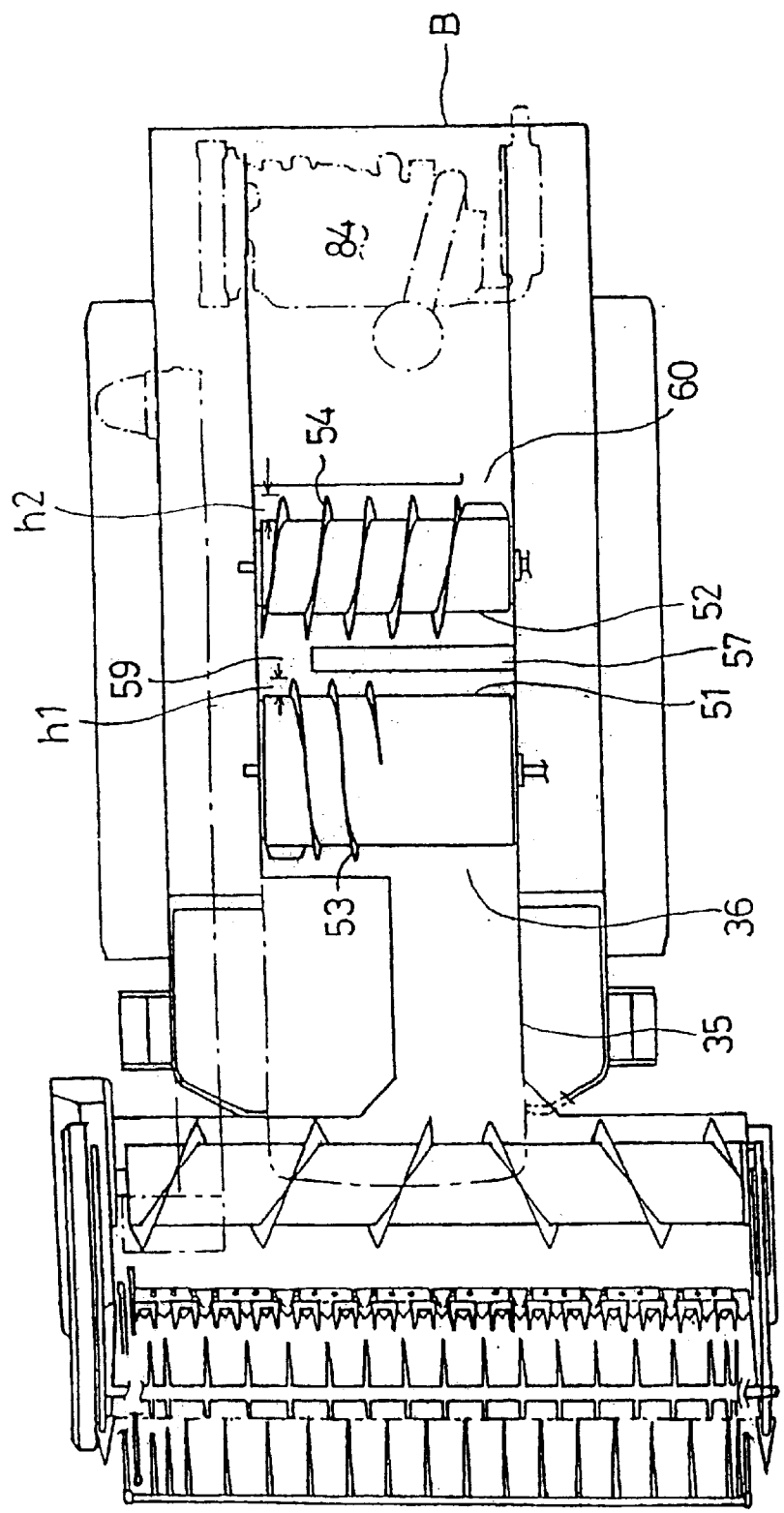
FIG. 16 is an entire plan view of the general purpose combine including the entire plan view of the thresh unit according to an embodiment wherein a screw vane of the second rotor projects more than that of the first rotor.
Figure 17:
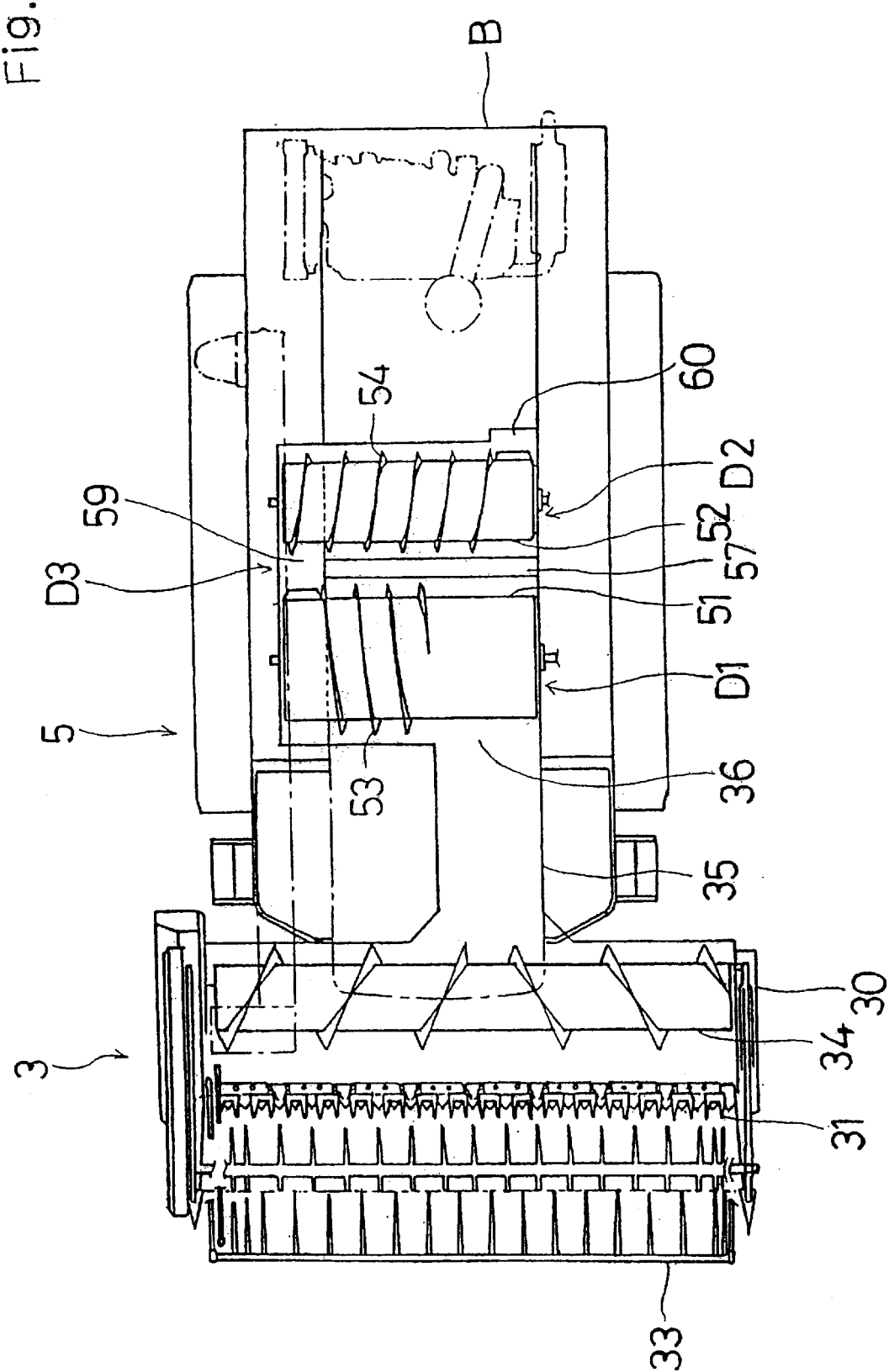
FIG. 17 is an entire view of the general purpose combine showing the interior plan view of the thresh unit according to an embodiment wherein the grain rod transferring route is provided outside the first and second threshing chambers.

FIG. 16 shows an embodiment for enhancing the capacity of threshing in second threshing chamber D2. In this embodiment, a projectional degree h2 of second screw vane 54 of second rotor 53 is larger than a projectional degree h1 of first screw vane 53 of first rotor 51. Resulting threshing chamber D2 between second rotor 52 and second screen 56 is so expanded as to-improve the loosening of grain rods or the separation of grains from grain rods, thereby preventing the loss of grains. FIG. 17 shows an embodiment wherein first and second threshing chambers D1 and D2 are further extended for enhancing the capacity of threshing. In this regard, a grain rod passage D3 is disposed on the right outsides of both first and second threshing chambers D1 and D2, thereby enabling first and second screens 55 and 56 to be sufficiently used for threshing. Grain rod passage D3 formed in a roughly box-like shape having openings on its side facing the threshing chambers are detachably attached onto the right side surfaces of first and second threshing chambers D1 and D2. The right side ends of first and second threshing chambers D1 and D2 are extended into grain rod passage D3 beyond the right side ends of first and second screens 55 and 56 so as to smoothen the transference of grain rods between first and second threshing chambers D1 and D2.

Figure 18:
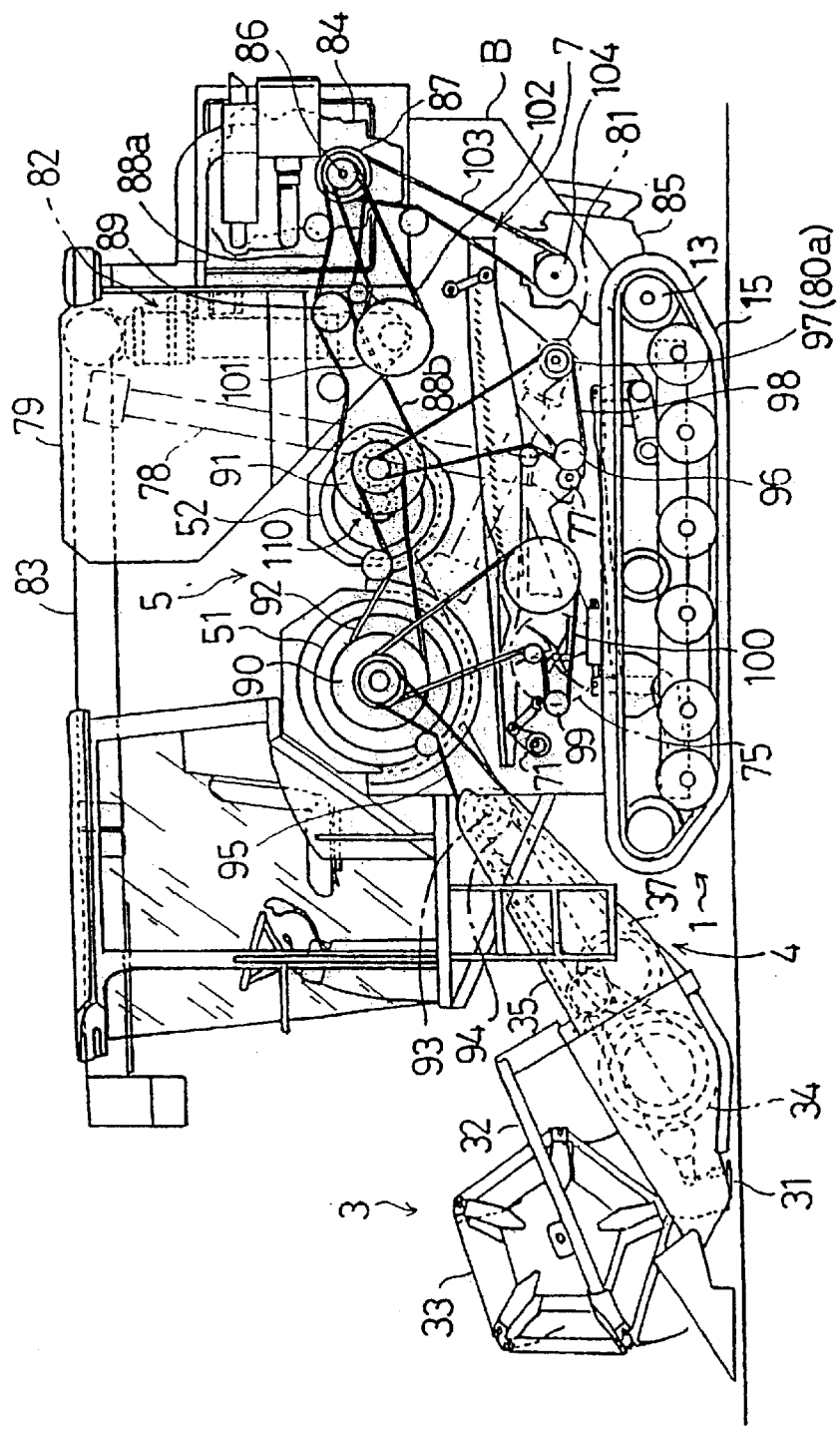
FIG. 18 is an entire side view of the general purpose combine showing its power transmission system according to an embodiment wherein the first and second rotors are rotated in opposite directions.
Figure 19:
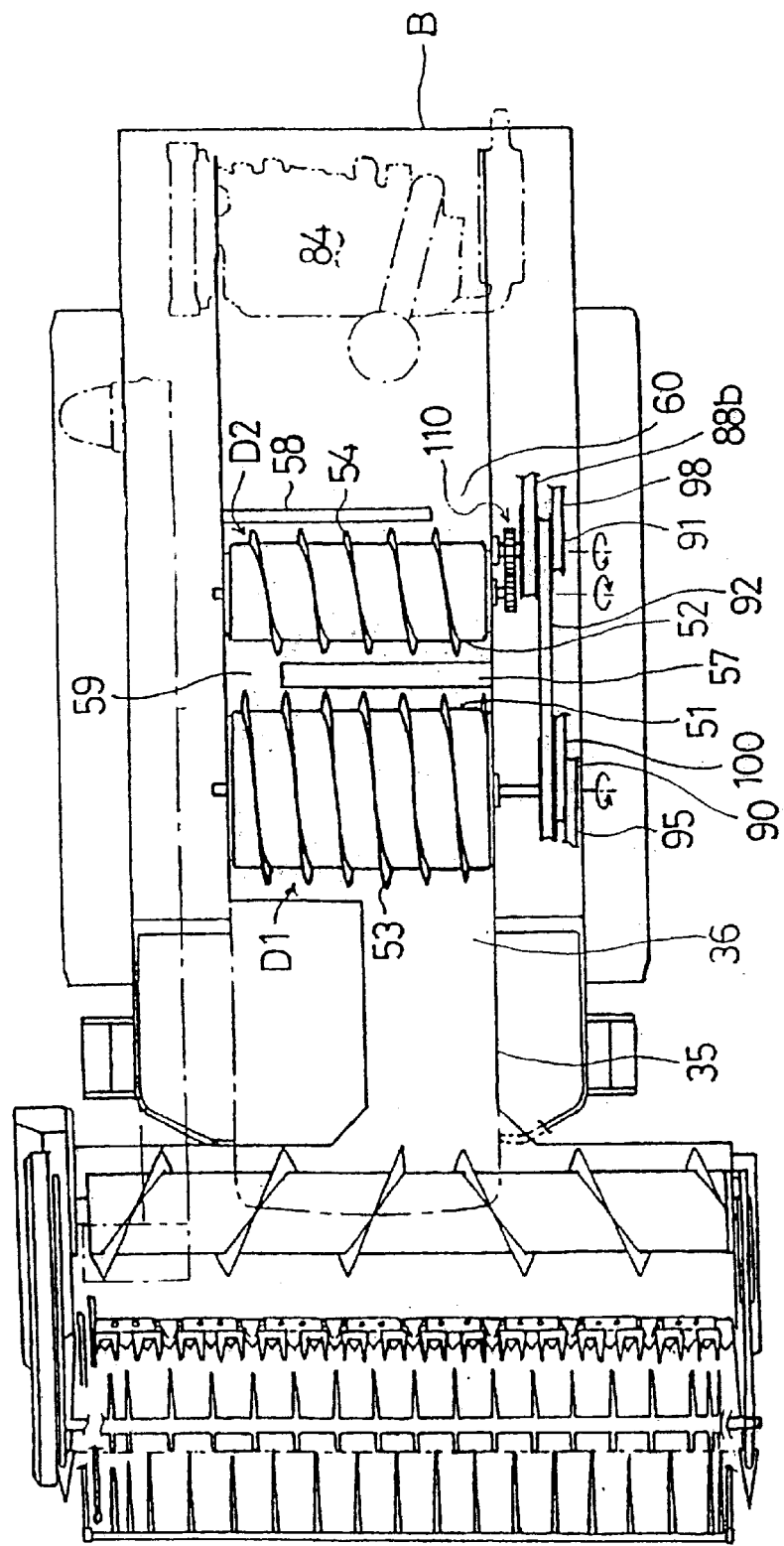
FIG. 19 is an entire plan view of the same showing the interior plan view of the thresh unit.

Referring to an embodiment shown in FIGS. 18 and 19, a shaft of second rotor pulley 91 is offset from the rotary shaft of second rotor 52 and the ends of both shafts are connected with each other through a reversing gear box 110, so that second rotor 52 is rotated oppositely to the rotary direction of second rotor pulley 91. Similarly to the basic embodiment, rotor connection belt 92 is interposed between first rotor pulley 90 and second rotor pulley 91 so as to rotate both pulleys 90 and 91 in the same direction. As a result, first and second rotors 51 and 52 are rotated in opposite directions. If the fed reaped grain rods are increased so as to make the layer of grain rods thicker so that only the grains abutting against first screen 55 are separated while the grains of grain rods abutting against first rotor 51 are not separated, the rotation of second rotor 52 in opposite to that of first rotor 51 reverses the layer, whereby the grain rods which have abutted against first rotor 51 come to abut against second screen 56, thereby completely threshing the fed reaped grain rods.

Next, description will be given on some embodiments regarding disposal of tailing return conveyor 81 shown in FIGS. 20 through 23.

Figure 20:
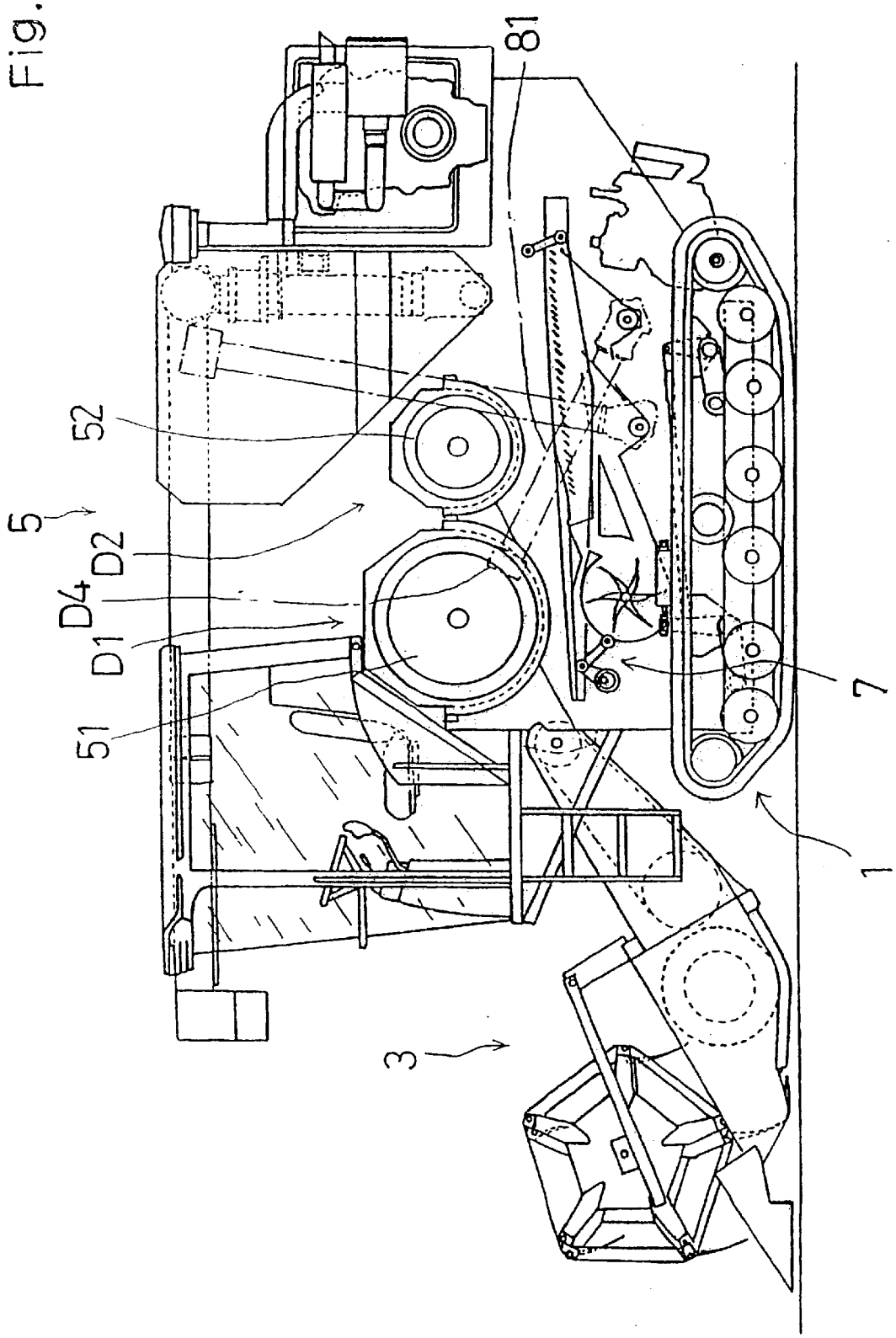
FIG. 20 is an entire side view of the general purpose combine showing the interior side view of the thresh unit according to an embodiment wherein the terminal end of a return conveyor is connected to the first threshing chamber.
Figure 21:
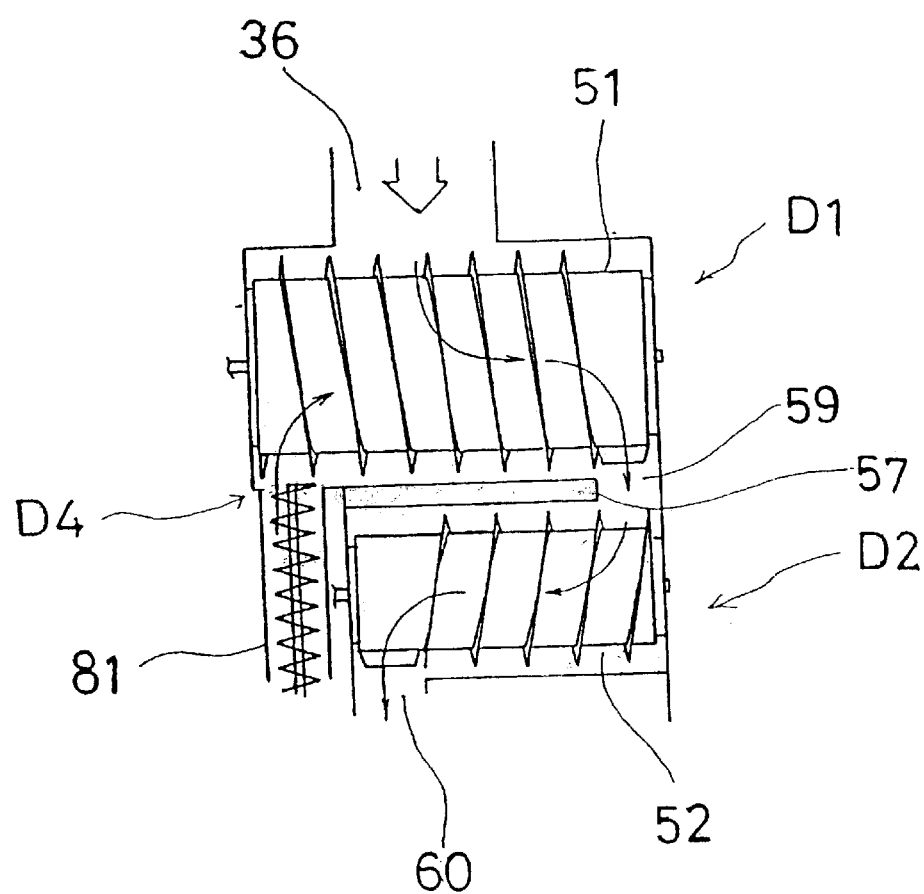
FIG. 21 is a plan view of the first and second threshing chambers of the same.

In an embodiment shown in FIGS. 20 and 21, the terminal end of tailing return conveyor 81 is disposed leftward from first threshing chamber D1 so as to communicate with a left side surface of first threshing chamber D1 through a tailing return port D4, thereby returning the tailings from second gutter 80 to the left side portion of first threshing chamber D1.

Figure 22:
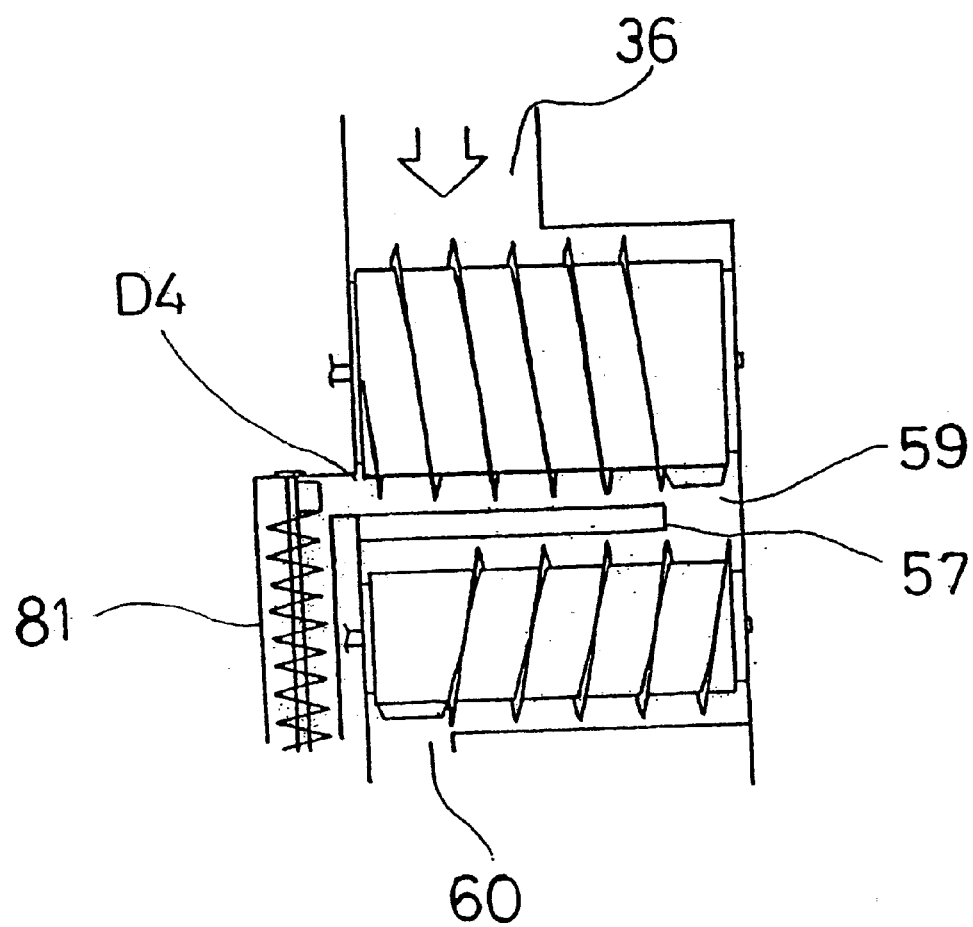
FIG. 22 is a plan view of the first and second threshing chambers of the same according to an alternative modified embodiment.

FIG. 22 shows a modification of the embodiment shown in FIGS. 20 and 21. First threshing chamber D1 and first rotor 51 are leftwardly extended so as to communicate at the rear side surfaces of their extended portions with the terminal end of tailing return conveyor 81, thereby returning the tailings from second gutter 80 to the left portion of first threshing chamber D1.

Referring to an embodiment shown in FIG. 23, the terminal end of tailing return conveyor 81, while being disposed above grain-flow pan 72 of shaking separator unit 7 similarly to the basic embodiment, communicates with the right side portion of grain-flow pan 72 of shaking separator unit 7. As a result, the terminal end of tailing return conveyor 81 is disposed laterally oppositely to the portion of thresh unit 5 joining with feeder housing 35. The grains and chaff from first threshing chamber D1 spread on grain-flow pan 72 are elementarily increased as they approach the lateral (in this embodiment, left) side of thresh unit 5 joining with feeder housing 35. In other words, they are naturally reduced as approaching the laterally opposite (in this embodiment, right) side of thresh unit 5. However, according to this embodiment, the tailings from tailing return conveyor 81 are supplied onto the laterally opposite side portion of grain-flow pan 72, so that the things to be separated are evenly spread on grain-flow pan 72, thereby enhancing the capacity of separation.

Next, description will be given on some embodiments regarding grain tank 79, grain discharge conveyor 82 and unloading tube 83 shown in FIGS. 24 through 27.

Figure 24:
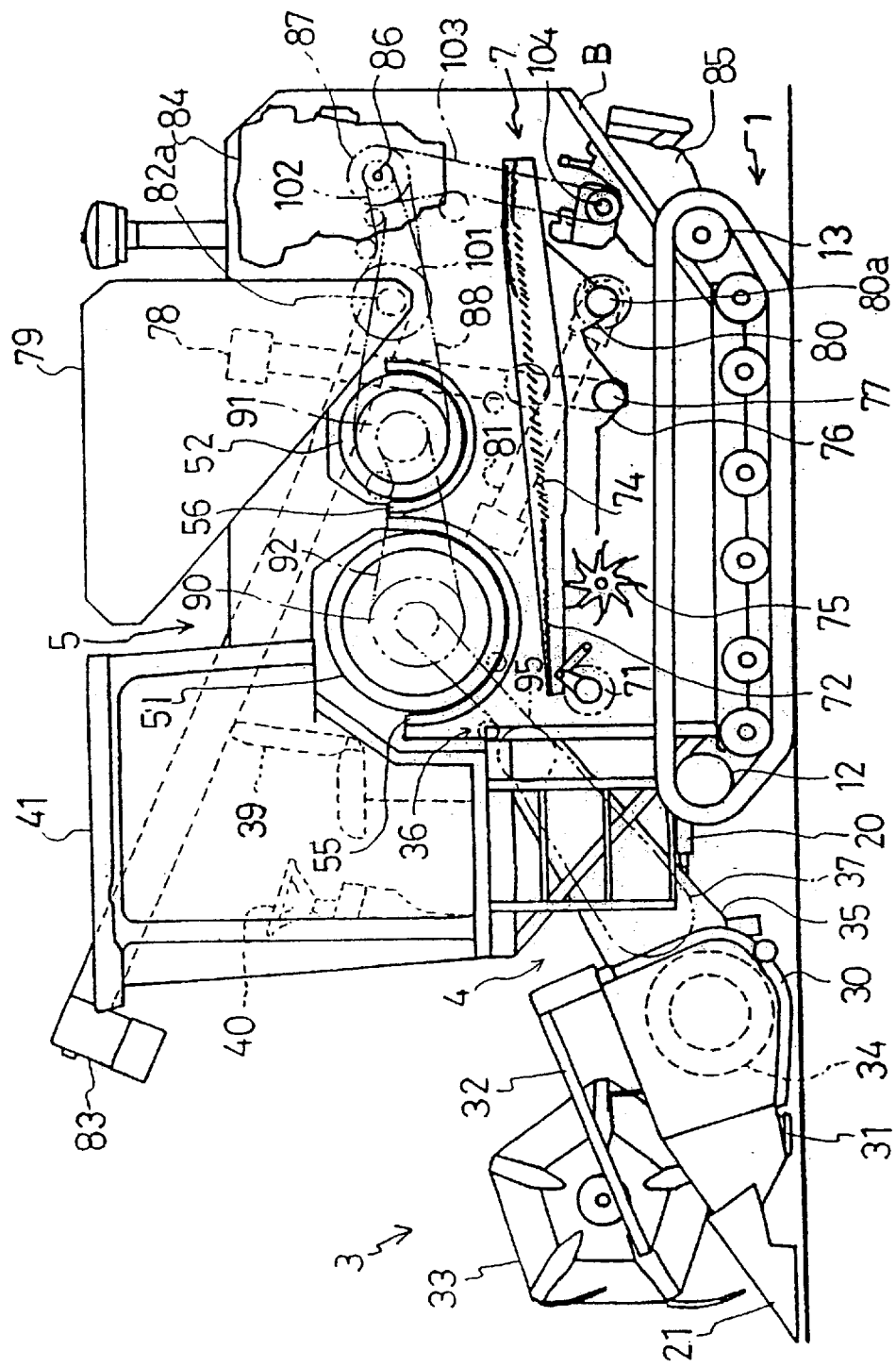
FIG. 24 is an entire side view of the general purpose combine showing the interior side view of the thresh unit according to an embodiment wherein a vertical grain elevator is omitted.

In an embodiment shown in FIGS. 24 through 26, grain tank 79 is extended at the front portion thereof over first rotor 51, thereby increasing its volume. Furthermore, as shown in FIGS. 25 and 26, the width of grain tank 79 is substantially as large as or larger than that of thresh unit 5, so that grain tank 79 is increased in volume and is constantly balanced in weight in the lateral direction of combine A whether it is filled with grains or not.

Also, in this embodiment, there is not disposed vertical grain discharge elevator 82b as shown in FIG. 1 and so on, so that the upstream end of unloading tube 83 is pivotally connected to the terminal end of lateral grain discharge auger 82a disposed along the bottom of grain tank 79. Unloading tube 83 is ordinarily oriented upwardly forward slantwise toward its terminal end. Thus, the removal of vertical grain discharge elevator 82b simplifies the construction of unloading tube 83, thereby saving costs and lightening combine A, and increasing the volume of grain tank 79.

Figure 27:
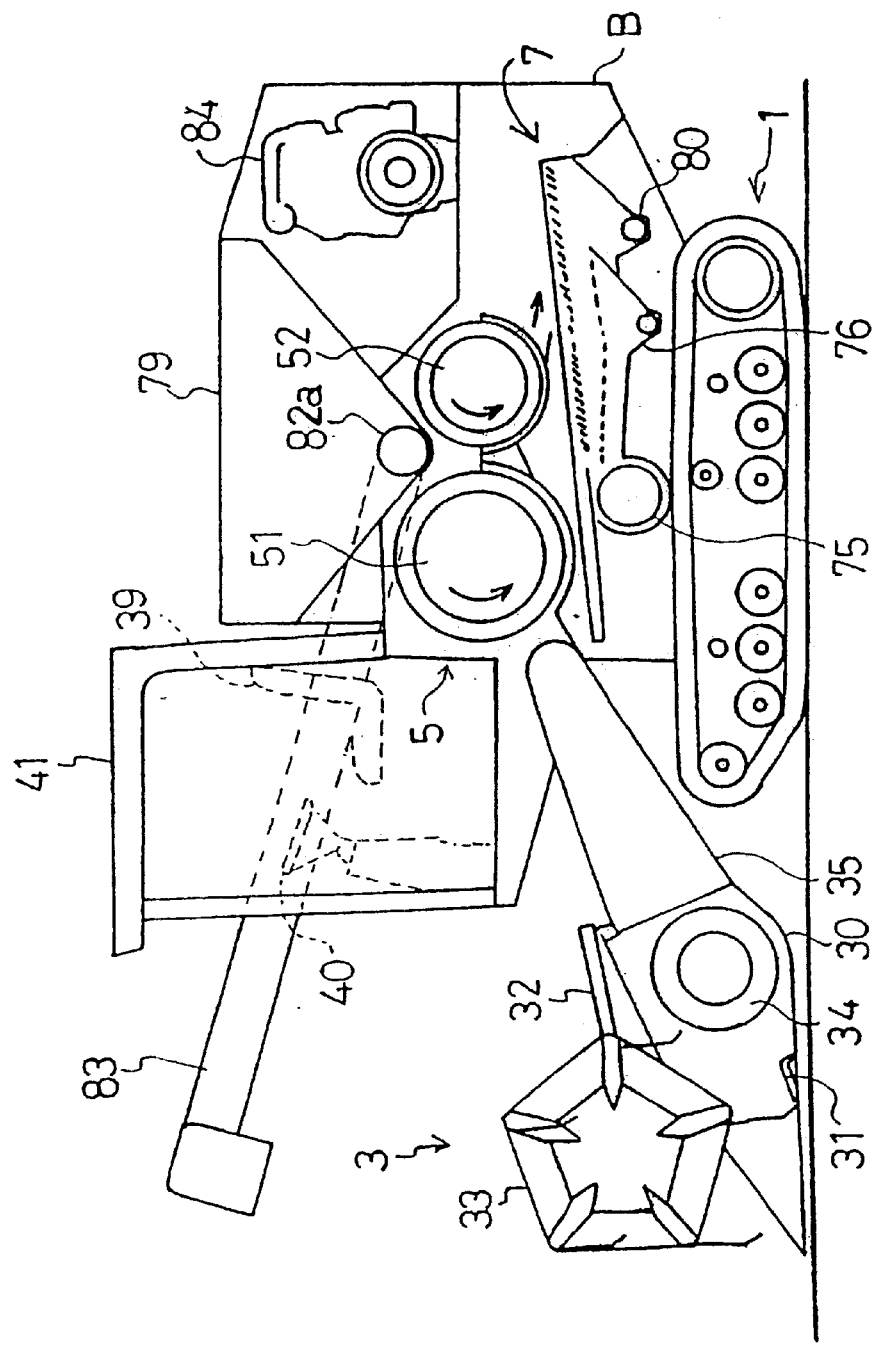
FIG. 27 is an entire side view of the general purpose combine showing the interior side view of the thresh unit according to an embodiment wherein the bottom end of the grain tank is disposed between the first and second threshing rotors.

As shown in FIG. 27, in addition to the forward extension of grain tank 79 over first rotor 51, a bottom pan 79a of grain tank 79 is made roughly inverted triangular when viewed in side, so that the lowest portion thereof is inserted into a roughly inverted triangular space between first and second rotors 51 and 52. Resulting grain tank 79, whose lowest portion is disposed at substantially longitudinal middle of combine A, effects the stationary weight balance of combine A in its longitudinal direction whether being full of grains or not, in addition to that it is laterally substantially as wide as or wider than thresh unit 5 so as to keep combine A in stationary weight balance in its lateral direction whether being full of grains or not. Therefore, combine A, which comes to have a stationary centroid, can reap crops steadily regardless of the amount of grains collected in grain tank 79.

Additionally, grain discharge conveyor 82 in the embodiment shown in FIG. 27 also comprises only horizontal grain discharge auger 82a without vertical grain discharge elevator 82b, so that unloading tube 83 is connected at the upstream end thereof to the terminal end of grain discharge anger 82a, and is extended upwardly forward to its terminal end.

This shown arrangement of grain tank 79, grain discharge conveyor 82 and unloading tube 83 is also applied in the above-mentioned embodiment shown in FIG. 15.

Figure 28:
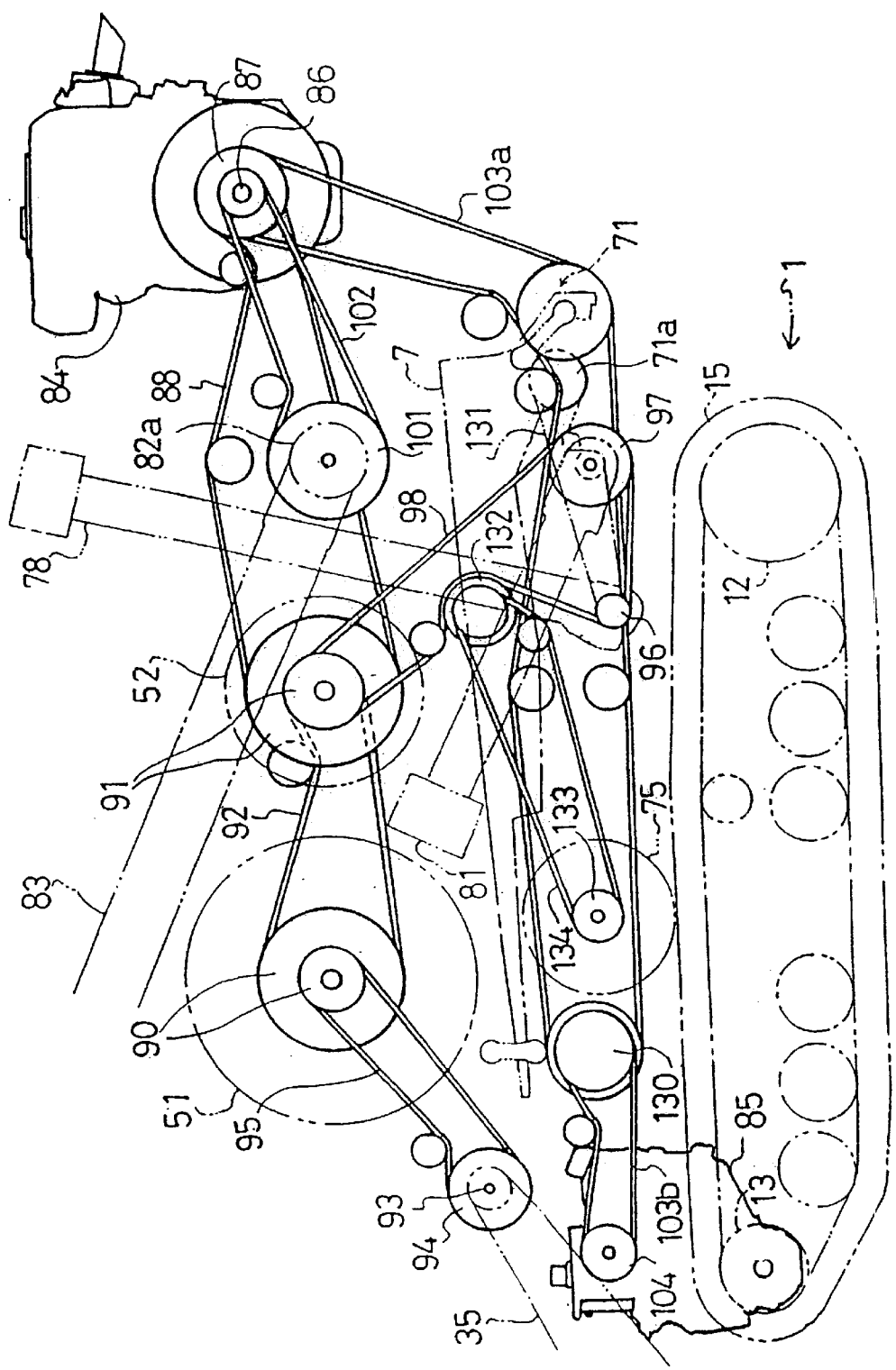
FIG. 28 is a side view of the power transmission system when the transmission casing is disposed on a forward portion of the combine body.

Finally, description will be given on the power transmission systems, especially an embodiment shown in FIG. 28 regarding that for travelling of combine A.

In this embodiment, sprocket wheels 13 are disposed on the front ends of travelling units 1 (and idlers 12 are disposed on the rear end thereof) while they are disposed on the rear ends in the above-mentioned embodiments shown in FIGS. 1 and so on. Accordingly, transmission casing 85 is disposed below the rear of reaping header 3 (the front end of thresh unit 5). Therefore, the driving force of engine output pulley 87 is transmitted to travelling input pulley 104 projecting on either left or right side of transmission casing 85 through a first travelling drive belt 103a, a relay pulley 130 as a multiple pulley and a second travelling drive belt 103b.

Referring to the transmission system for other than travelling, the driving force of engine output pulley 89 is transmitted to second rotor pulley 91 through a rotor drive belt 88 interposed therebetween without relay pulley 89. Similarly to the basic embodiment, rotor connection belt 92 is interposed between second rotor pulley 91 and first rotor pulley 90, reaping-and-feeding drive belt 95 is between second rotor pulley 91 and reaping-and-feeding drive pulley 94, and grain discharge drive belt 102 is between engine output pulley 87 and grain discharge drive pulley 101. For driving clean grain auger 77 and tailing return conveyor 81, second rotor pulley 91, clean grain auger drive pulley 96 and tailing auger drive pulley 97 are bound together by conveyor drive belt 98.

Shaking mechanism 71 is disposed at the rear end of shaking separator unit 7 apart from air fan 75 because of transmission casing 85 disposed at the front portion of the combine body. Therefore, it is difficult to drive shaking mechanism 71 by use of the same belt of that for driving air fan 75. Then, onto the shafts of sprockets 96 and 97 and an eccentric shaft 71a are provided respective sprockets for driving shaking mechanism 71. The three sprockets are bound together by a shaking drive chain 131, so as to make shaking mechanism 71 of shaking separator 7 interlock with second rotor 52 (and first rotor 51) and conveyors (augers) 77, 78, 80a and 81.

Furthermore, conveyor drive belt 98 is hung on one of a multiple pulley 132, and an air fan drive belt 134 is interposed between multiple pulley 132 and an air fan drive pulley 133. Thus, shaking mechanism 71 disposed behind conveyor drive belt 98 is provided with shaking drive chain 131, and air fan 75 disposed before belt 98 is provided with air fan drive belt 134, so that shaking mechanism 71 and air fan 75 interlock with conveyors (augers) 77, 78, 80a and 81. Alternatively, a belt may be interposed between first rotor pulley 90 and air fan drive pulley 133 so as to make air fan 75 interlock with first rotor 51.

The power transmission systems comprising the pulleys and belts (further including the chain and sprockets) according to this embodiment are disposed on the same left or right side with output shaft 86 of engine 84, so that they have no bevel gear for reorientation of force, whereby they are simplified and the loss of power transmitted through them are reduced.

INDUSTRIAL USABILITY

As described hitherto, the general purpose combined harvester and thresher according to the present invention, which reaps various kinds of crops such as rice or wheat; threshes reaped grain rods; and collects and suitably unloads clean grains, usefully has high capacity of threshing, operational easiness, compactness of its body, and stationary balance in weight.

What is claimed is:

1. A general purpose combined harvester and thresher, characterized in that a pair of front and rear auger type threshing rotors horizontally oriented and disposed perpendicular to the traveling direction are juxtaposed in a thresh unit, front and rear screens are disposed beneath said front and rear threshing rotors, respectively, and a terminal end of a tailing return conveyer extends from a tailing auger of a shaking separator and communicates with a portion of said thresh unit that is laterally opposite to a junction of said thresh unit and a feeder housing, wherein said junction is above a grain-flow pan of said shaking separator.

2. A general purpose combined harvester and thresher, characterized in that a plurality of auger type threshing rotors are disposed in a thresh unit, said threshing rotors have horizontal axes perpendicular to the traveling direction of the harvester and thresher, and are juxtaposed one behind another, wherein any adjacent two of said threshing rotors form along their axes respective routes for conveyance of grain rods which are laterally directed opposite to each other, each of said routes having a head end and a terminal end, wherein the terminal end of the route along the front threshing rotor of said any two adjacent threshing rotors communicates with the head end of the route along the rear threshing rotor of said any two adjacent threshing rotors, so that a series of routes for conveyance of grain rods is constructed from the front threshing rotor to the rear threshing rotor.

3. The general purpose combined harvester and thresher as set forth in claim 2, characterized in that diameters of said plurality of threshing rotors are different from one another.

4. The general purpose combined harvester and thresher as set forth in claim 2, characterized in that the front threshing rotor is diametrically larger than the rear threshing rotor of said any adjacent two threshing rotors.

5. The general purpose combined harvester and thresher as set forth in claim 2, characterized in that horizontal slide rails are juxtaposed before and behind in said thresh unit, wherein the extentional directions of said slide rails are perpendicular to the traveling direction, and a slide framework is slidably supported by said slide rails, such that each of said threshing rotors is journaled in an interior of said slide framework, and each of said threshing rotors is detachably attached to a pulley for rotation thereof.

6. The general purpose combined harvester and thresher as set forth in claim 2, characterized in that a feeder housing for conveyance of reaped grain rods communicates with said thresh unit, and both bars project from an outer peripheral surface of said threshing rotor facing said feeder housing.

7. The general purpose combined harvester and thresher as set forth in claim 2, characterized in that a feeder housing for conveyance of reaped grain rods communicates with said thresh unit, and a pitch of a screw vane provided on the outer surface of said threshing rotor facing said feeder housing is substantially as large as the width of a rear end of said feeder housing.

8. The general purpose combined harvester and thresher as set forth in claim 2, characterized in that a grain tank having a lateral width substantially as large as that of said thresh unit is disposed above said thresh unit.

9. The general purpose combined harvester and thresher as set forth in claim 8, characterized in that an auger for discharging grains from said grain tank is disposed in said grain tank between said any two adjacent threshing rotors.

10. The general purpose combined harvester and thresher as set forth in claim 9, characterized in that an unloading tube is disposed on either the left or right side of said grain tank so as to be connected at a basic end of said unloading tube to said auger for discharging grains, and is extended forwardly.

11. The general purpose combined harvester and thresher as set forth in claim 9, characterized in that an engine is disposed behind said thresh unit.

12. The general purpose combined harvester and thresher as set forth in claim 11, characterized in that a transmission casing is disposed below said engine.

13. The general purpose combined harvester and thresher as set forth in claim 12, characterized in that said transmission casing, at least one of said plurality of threshing rotors, a separator, a reaping header and a feeder are driven together on either left or right side of the combined harvester and thresher body toward which an output shaft of said engine projects.

14. A general purpose combined harvester and thresher, characterized in that a pair of front and rear auger type threshing rotors which are horizontally oriented and disposed perpendicular to the traveling direction are juxtaposed in a thresh unit, and rotated about their axes in the same direction as each other, wherein said pair of threshing rotors form along their axes respective routes for conveyance of grain rods which are laterally directed opposite to each other, wherein each of said routes have a terminal end and a head end, and the terminal end of the route along said front threshing rotor communicates with the head end of the route along said rear threshing rotor, so that a series of routes for conveyance of grain rods is constructed from said front threshing rotor to said rear threshing rotor.

15. The general purpose combined harvester and thresher as set forth in claim 14, characterized in that the diameter of said front threshing rotor is larger than that of said rear threshing rotor.

16. The general purpose combined harvester and thresher as set forth in claim 14, characterized in that the peripheral speed of said rear threshing rotor is higher than that of said front threshing rotor.

17. A general purpose combined harvester and thresher, characterized in that a pair of front and rear auger type threshing rotors horizontally oriented and disposed perpendicular to the traveling direction are juxtaposed in a thresh unit, and the projectional degree of a screw vane provided on said rear threshing rotor is larger than that of a screw vane provided on said front threshing rotor.

18. A general purpose combined harvester and thresher, characterized in that a pair of front and rear auger type threshing rotors horizontally oriented and disposed perpendicular to the traveling direction are juxtaposed in a thresh unit, and a front screen and a rear screen are disposed beneath said front and rear threshing rotors respectively, so as to form along the axes of their corresponding threshing rotors respective routes for conveyance of grain rods which are laterally directed opposite to each other, wherein each of said routes has a terminal end and a head end, and the terminal end of the route along said front threshing rotor communicates with the head end of the route along said rear threshing rotor, so that a series of route for conveyance of grain rods is constructed from said front threshing rotor to said rear threshing rotor, and a lowest end of said front screen is positioned higher than a lowest end of said rear screen.

19. A general purpose combined harvester and thresher, characterized in that a pair of front and rear auger type threshing rotors horizontally oriented and disposed perpendicular to the traveling direction are juxtaposed in a thresh unit, and a front screen and a rear screen having mesh sizes that are different from each other are disposed beneath said front and rear threshing rotors, respectively.

20. The general purpose combined harvester and thresher as set forth in claim 19, characterized in that the mesh size of said front screen is smaller than that of said rear screen.

21. A general purpose combined harvester and thresher, characterized in that a pair of front and rear auger type threshing rotors horizontally oriented and disposed perpendicular to the traveling direction are juxtaposed in a thresh unit, wherein said pair of threshing rotors form along their axes respective routes for conveyance of grain rods which are laterally directed opposite to each other and are separated from each other by a lateral partition, and wherein a passage at one end of said partition allows communication between a terminal end of the route along said front threshing rotor and a head end of the route along said rear threshing rotor, so that a series of routes for conveyance of grain rods is constructed from said front threshing rotor to said rear threshing rotor.

22. The general purpose combined harvester and thresher as set forth in claim 21, characterized in that a terminal end of a tailing return conveyor is in communication with a tailing auger disposed in a shaking separator unit, and wherein said terminal end of said tailing return conveyor communicates with the head end of the route along said front threshing rotor outside the end of said partition that is opposite of said passage.

23. A general purpose combined harvester and thresher, characterized in that a pair of front and rear auger type threshing rotors horizontally oriented and disposed perpendicular to the traveling direction are juxtaposed in a thresh unit, and rotated oppositely to each other, wherein said pair of threshing rotors form along their axes respective routes for conveyance of grain rods which are laterally directed opposite to each other, and wherein each of said routes has a terminal end and a head end, and the terminal end of the route along said front threshing rotor communicates with the head end of the route along said rear threshing rotor, so that a series of routes for conveyance of grain rods is constructed from said front threshing rotor to said rear threshing rotor.

24. The general purpose combined harvester and thresher as set forth in claim 23, characterized in that the diameter of said front threshing rotor is larger than that of said rear threshing rotor.

25. The general purpose combined harvester and thresher as set forth in claim 23, characterized in that the peripheral speed of said rear threshing rotor is higher than that of said front threshing rotor.

* * * * *